(12) United States Patent
Hiroi et al.

(10) Patent No.: US 7,534,517 B2
(45) Date of Patent: May 19, 2009

(54) FUEL CELL AND METHOD FOR MANUFACTURE THEREOF

(75) Inventors: Osamu Hiroi, Tokyo (JP); Hisatoshi Fukumoto, Tokyo (JP); Shoji Yoshioka, Tokyo (JP); Hideo Maeda, Tokyo (JP); Hiroaki Urushibata, Tokyo (JP); Hironori Kuriki, Toyko (JP); Takashi Nishimura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 779 days.

(21) Appl. No.: 10/973,401

(22) Filed: Oct. 27, 2004

(65) Prior Publication Data

US 2005/0123819 A1 Jun. 9, 2005

(30) Foreign Application Priority Data

| Oct. 27, 2003 | (JP) | ............................. 2003-365723 |
| Jul. 20, 2004 | (JP) | ............................. 2004-211119 |
| Aug. 23, 2004 | (JP) | ............................. 2004-242654 |

(51) Int. Cl.
*H01M 2/08* (2006.01)
(52) U.S. Cl. .............................. 429/34; 429/35; 429/36
(58) Field of Classification Search .................. 429/34, 429/35, 36, 38, 30, 39; 502/101
See application file for complete search history.

(56) References Cited

U.S. PATENT DOCUMENTS 6,475,656 B1* 11/2002 Koschany et al. ............. 429/30

FOREIGN PATENT DOCUMENTS

| CN | 1379919 A | 11/2002 |
| DE | 197 13 250 A1 | 10/1998 |
| DE | 197 03 214 C2 | 10/2003 |
| JP | 8-45517 | 2/1996 |
| JP | 8-148170 | 6/1996 |
| JP | 2001-510932 | 8/2001 |
| WO | WO 99/04446 | 1/1999 |

* cited by examiner

*Primary Examiner*—Raymond Alejandro
(74) *Attorney, Agent, or Firm*—Oblon, Spivak, McClelland, Maier & Neustadt, P.C.

(57) ABSTRACT

A fuel cell includes a solid polymer electrolyte membrane and cathode and anode catalyst layers held between a fuel electrode substrate having a surface area larger than that of the cathode catalyst layer and an oxidizer electrode substrate having a surface area larger than that of the anode catalyst layer. The fuel electrode substrate includes a fuel-sealing support portion surrounding the cathode catalyst layer. The oxidizer electrode substrate includes an oxidizer-sealing support portion surrounding the anode catalyst layer. The fuel-sealing and oxidizer-sealing support portions each include pores partially or wholly filled with a resin. The fuel-sealing support portion is bonded to the membrane by the resin at a position closer to an outer edge of the membrane than is the cathode catalyst. The oxidizer-sealing support portion is bonded to the membrane by the resin at a position closer to the outer edge of the membrane than is the anode catalyst.

20 Claims, 17 Drawing Sheets

FIG. 5

| Evaluated subject | Evaluation conditions | Number of samples | Number of cells in which output became less than 500 mV | Number of cells in which film was damaged |
|---|---|---|---|---|
| Present invention | Continuous | 5 | 0 | 0 |
| | DSS | 5 | 0 | 0 |
| | Low-humidity | 5 | 1 | 0 |
| Conventional | Continuous | 5 | 1 | 0 |
| | DSS | 5 | 3 | 2 |
| | Low-humidity | 5 | 5 | 4 |

| Bonding width | 0.2 | 0.5 | 1.0 | 3.0 | 5.0 | 7.0 |
|---|---|---|---|---|---|---|
| Open circuit voltage (mV) at commencement | 951 | 952 | 952 | 951 | 951 | 952 |
| Open circuit voltage (mV) after 2,000 hours | 940 | 946 | 948 | 948 | 948 | 947 |
| Load voltage (mV) | 725 | 723 | 722 | 717 | 714 | 702 |

FUEL CELL AND METHOD FOR MANUFACTURE THEREOF

BACKGROUND OF THE INVENTION

1. Field of the Invention

The present invention relates to a fuel cell making use of an electrochemical reaction to generate electric power, and to a method for the manufacture thereof.

2. Description of the Related Art

Fuel cells are devices for converting chemical energy directly into electric energy by interposing an electrolyte membrane between a pair of opposing first and second electrodes, supplying a fuel to the first electrode and an oxidizer to the second electrode, and permitting the fuel and the oxidizer to react inside the fuel cell electrochemically. Among such fuel cells, solid polymer fuel cells can achieve high output characteristics because they use solid polymer electrolyte membranes having proton conductivity for the electrolyte membrane.

The electrochemical reactions in these solid polymer fuel cells are sustained by continuously supplying a reactant gas. Ion conductivity of the electrolyte membrane, which plays an important role in these electrochemical reactions, is generally proportional to the water content of the solid polymer electrolyte membrane. In addition, because the water content of the solid polymer electrolyte membrane is dependent upon the humidity of the reactant gas, the reactant gas is humidified during operation. It is also necessary to seal off the gases flowing to the first and second electrodes so as to prevent leakage not only to exterior portions, but also between the first and second electrodes. Thus, because the solid polymer electrolyte membrane plays a role in preventing leakage of the reactant gas between the first and second electrodes, the solid polymer electrolyte membrane is extended to outer peripheral portions of an electrode portion so as to prevent a gas seal between the first and second electrodes from being compromised.

However, because the solid polymer electrolyte membrane contracts when it dries out and swells when it absorbs moisture, stresses act on the solid polymer electrolyte membrane with repeated running and stopping. In addition, if low-humidity air is supplied through an oxidizer supply port, the solid polymer electrolyte membrane dries in an upstream region of the airflow channel, and the solid polymer electrolyte membrane is wet by water produced by the reaction in a downstream region thereof. Because stresses act on the solid polymer electrolyte membrane in this manner, there has been a risk that the solid polymer electrolyte membrane may be damaged unless the solid polymer electrolyte membrane is reliably supported.

In addition, damage to the electrolyte membrane often occurs in portions of the electrolyte membrane positioned at a boundary between a power generating portion and a gas seal portion. One of the reasons that can be given therefor is deformation and concentrations of local stresses in the electrolyte membrane at the boundary between the power generating portion and the gas seal portion due to at least one side of the electrolyte membrane not being fixed. In particular, when the electrolyte membrane in this portion is exposed to wet reactant gas, damage to the electrolyte membrane occurs more easily due to stresses accompanying contraction, etc., of the electrolyte membrane. Another reason that can be given is concentrations of stress resulting from nonuniformity of water content in the electrolyte membrane. In other words, the electrolyte membrane is more likely to be wetted by the reaction product water in the power generating portion, and on the other hand, the electrolyte membrane is more likely to dry out in the gas seal portion.

Thus, if the electrolyte membrane cracks, or pinholes form in this manner, gas may leak through these between the first and second electrodes, reducing the output voltage of the fuel cell. In addition, damage to the electrolyte membrane may spread if operation is continued without intervention because the rate of gas leakage will increase, react on a catalyst, and partially increase the temperature. Thus, ultimately the fuel cell will cease to function.

Thus, in conventional fuel cells, portions of gas-permeable porous electrodes overlapping with a sealant may be impregnated by the sealant. (For example, see Japanese Patent Laid-Open No. HEI 8-45517.) Processes may also be applied to the solid polymer electrolyte membrane so as to enable the solid polymer electrolyte membrane to be reliably supported. For example, the solid polymer electrolyte membrane has: a current-carrying portion having a larger surface area than the first and second electrodes, contacting the first and second electrodes; and a non-current-carrying portion not contacting the first and second electrodes. A reinforcing material may be included at a boundary portion between this current-carrying portion and the non-current-carrying portion. A fluorine-containing polymer may be used for this reinforcing material. (For example, see Japanese Patent Laid-Open No. 2000-260443) However, stresses are concentrated at a boundary portion between the current-carrying portion of the solid polymer electrolyte membrane and the non-current-carrying portion reinforced by the reinforcing material, and there has been a risk that cracking may occur along that boundary portion.

Thus, an electrode substrate supporting the solid polymer electrolyte membrane may be reinforced so as to enable the solid polymer electrolyte membrane to be reliably supported. For example, the electrode substrate has a surface area identical to that of the solid polymer electrolyte membrane, and a peripheral edge portion of the electrode substrate is compacted by a compactant constituted by an adhesive. The solid polymer electrolyte membrane is supported by this compacted peripheral edge portion, and forms a gas seal. Compaction may be performed using a polytetrafluoroethylene dispersion for the compactant by impregnating the peripheral edge portion then removing a solvent. (For example, see Japanese Patent Laid-Open No. HEI 8-148170)

Another method for reinforcing the electrode substrate is to impregnate a sealing region surrounding the power generating region of the electrodes with an injection moldable thermosetting liquid compound and harden it. (For example, see Japanese Patent Publication No. 2001-510932)

Now, as disclosed in Patent Literature 3, compaction of the electrode substrate may be performed by impregnating the electrode substrate with a polytetrafluoroethylene dispersion functioning as a compactant, then removing a solvent. However, one problem has been that many communicating pores remain in a resin that has been hardened by performing impregnation then removing the solvent, making it difficult to seal off the fuel and the oxidizer gas. In addition, because the solid polymer electrolyte membrane is stacked after the electrode substrate has been compacted, another problem has been that it is difficult to seal the gases off completely since the surface of the solid polymer electrolyte membrane is merely in contact with and not bonded to the surface of the compacted portion of the electrode substrate.

As disclosed in Patent Literature 4, an integral seal may also be formed by impregnating a portion of an electrode layer of a membrane electrode assembly with an injection moldable thermosetting liquid compound as a sealant material and hardening it. However, since electrical conductivity and gaseous diffusivity are required of the electrode portions, porous carbon materials are generally used. For that reason, another problem has been that it is difficult to inject the liquid compound only in the sealing region of the electrodes with complete vacuum impregnation, and it also enters the electrochemically active region, reducing the area of the active region.

SUMMARY OF THE INVENTION

An object of the present invention is to provide a fuel cell having a sealing portion for an electrode substrate reliably forming a gas seal and supporting a solid polymer electrolyte membrane uniformly while ensuring a satisfactory electrochemically active region, and to provide a method for the manufacture thereof.

In order to achieve the above object, according to one aspect of the present invention, there is provided a fuel cell including a membrane electrode composite body in which a cathode catalyst layer and an anode catalyst layer are joined to central portions of two surfaces of a solid polymer electrolyte membrane and further held from two sides between a fuel electrode substrate having a surface area that is larger than that of the cathode catalyst layer and an oxidizer electrode substrate having a surface area that is larger than that of the anode catalyst layer, wherein: pores of a fuel-sealing support portion surrounding the cathode catalyst layer in the fuel electrode substrate are partially or wholly filled with a resin; pores of an oxidizer-sealing support portion surrounding the anode catalyst layer in the oxidizer electrode substrate are partially or wholly filled with the resin; and the fuel-sealing support portion and the oxidizer-sealing support portion are bonded to the solid polymer electrolyte membrane by the resin.

In a fuel cell according to the present invention, because electrode substrates are included to support the solid polymer electrolyte membrane so as to prevent local deformation and concentrations of stress while reliably forming a gas seal, damage to the solid polymer electrolyte membrane can be prevented. Because the gas seal form is reliably, service life is extended by reducing undervoltage in the fuel cell, and safety is improved by preventing combustion of fuel gas and abnormal overheating of the fuel cell.

BRIEF DESCRIPTION OF THE DRAWINGS

FIG. 5 is a table showing evaluation results;

DETAILED DESCRIPTION OF THE PREFERRED EMBODIMENT

A preferred embodiment of the present invention will now be explained with reference to the drawings.

Embodiment 1

Figure 1:
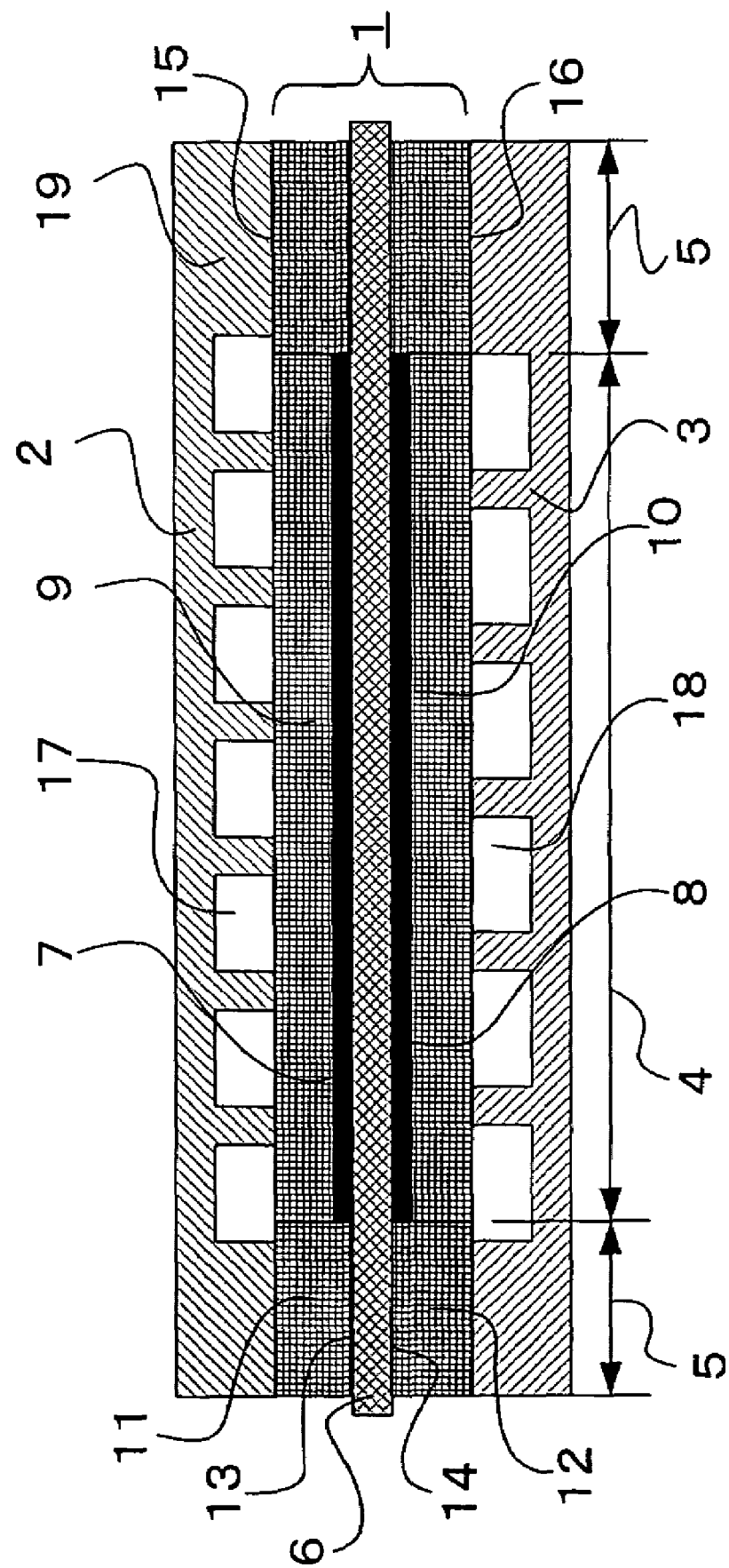
FIG. 1 is a cross section of a fuel cell according to the present invention.

FIG. 1 is a cross-sectional schematic diagram of a solid polymer fuel cell according to Embodiment 1 of the present invention.

A single cell of this solid polymer fuel cell (hereinafter "fuel cell") has: a membrane electrode composite body 1; and an electrically-conductive oxidizer separator plate 2 and an electrically-conductive fuel separator plate 3, together holding the membrane electrode composite body 1 from two sides. The membrane electrode composite body 1 has: a power generating portion 4 for generating electric power by ionizing into protons hydrogen functioning as a fuel, conducting the protons as ions, and oxidizing the protons with oxygen functioning as an oxidizer; and a sealing portion 5 surrounding a perimeter of the power generating portion 4 to seal off the fuel and the oxidizer.

The membrane electrode composite body 1 has: a proton-conductive solid polymer electrolyte membrane (hereinafter "electrolyte membrane") 6 spreading over an entire surface of the power generating portion 4 and the sealing portion 5; an anode catalyst layer 7 contacting a central portion of a first surface of the electrolyte membrane 6 and positioned in the power generating portion 4; a cathode catalyst layer 8 contacting a central portion of a second surface of the electrolyte membrane 6 and positioned in the power generating portion 4; an oxidizer electrode substrate 9 positioned in the power generating portion 4 and the sealing portion 5 and covering the anode catalyst layer 7; and a fuel electrode substrate 10 positioned in the power generating portion 4 and the sealing portion 5 and covering the cathode catalyst layer 8. An oxidizer-sealing support portion 11 of the oxidizer electrode substrate 9 and a fuel-sealing support portion 12 of the fuel electrode substrate 10, positioned in the sealing portion 5, are filled with a thermoplastic resin.

The electrolyte membrane 6 is bonded by a thermoplastic resin at an interface 13 with the oxidizer-sealing support portion 11 and at an interface 14 with the fuel-sealing support portion 12, respectively. In addition, the electrically-conductive oxidizer separator plate 2 and the oxidizer-sealing support portion 11 are bonded to each other by a thermoplastic resin at an interface 15. In addition, the electrically-conductive fuel separator plate 3 and the fuel-sealing support portion 12 are bonded to each other by a thermoplastic resin at an interface 16.

An oxidizer gas channel 17 for conducting the oxidizer is disposed on a surface of the electrically-conductive oxidizer separator plate 2 facing the oxidizer electrode substrate 9. In addition, a fuel gas channel 18 for conducting the fuel is disposed on a surface of the electrically-conductive fuel separator plate 3 facing the fuel electrode substrate 10. This oxidizer gas channel 17 extends to outer edge portions 19 of the electrically-conductive oxidizer separator plate 2, and in addition, aligns with apertures disposed through the outer edge portions 19 of the electrically-conductive oxidizer separator plate 2 in a thickness direction. When a plurality of single cells are stacked, these apertures align with apertures disposed in the electrically-conductive fuel separator plate 3 of the single cells stacked above and below, and in addition, align sequentially with apertures disposed on the electrically-conductive oxidizer separator plate 2 above. An aperture disposed in the electrically-conductive oxidizer separator plate 2 of the single cell stacked on top functions as an oxidizer supply port and the oxidizer is supplied from there. Similarly, an aperture disposed in the electrically-conductive fuel separator plate 3 of the single cell stacked at the bottom functions as an oxidizer discharge port and excess oxidizer is discharged from there. The fuel is also is supplied and discharged in a similar manner.

Any electrolyte membrane superior in long-term stability in an environment inside a fuel cell, having high gas impermeability, and having high proton conductivity and low electron conductivity can be used for the electrolyte membrane 6. Generally, solid polymer electrolyte membranes composed of perfluoric backbones and sulfonic acid groups are used.

The cathode catalyst layer 8 and the anode catalyst layer 7 are composed of: catalyst particles; and polymer electrolytes for performing proton exchange with the catalyst particles. It is also possible to mix in additives such as mineral particles, polymer particles, or carbon particles, etc., as required. These additives can be appropriately used with objectives of controlling hydrophilicity and hydrophobicity in the cathode catalyst layer 8 and the anode catalyst layer 7, or improving porosity of the cathode catalyst layer 8 or the anode catalyst layer 7, etc.

The cathode catalyst layer 8 and the anode catalyst layer 7 are disposed between the electrolyte membrane 6 and the oxidizer electrode substrate 9 and between the electrolyte membrane 6 and the fuel electrode substrate 10, respectively. Methods for forming this cathode catalyst layer 8 and anode catalyst layer 7 include: forming them directly on the electrolyte membrane 6; forming them on a separate substrate and then transferring them onto the electrolyte membrane 6; and forming them on the oxidizer electrode substrate 9 and the fuel electrode substrate 10 and then abutting them with the electrolyte membrane 6. In the fuel cell according to the present invention, any catalyst layer formation method can be used.

Catalytically-active metal microparticles such as platinum, etc., supported on surfaces of carbon black particles are generally used for the catalyst particles.

Any electrically-conductive porous body that is stable in the environment inside the fuel cell can be used for the oxidizer electrode substrate 9 and the fuel electrode substrate 10 serving the role of diffusing layers used to supply the oxidizer and the fuel to the cathode catalyst layer 8 and the anode catalyst layer 7. Porous bodies formed from a carbon fiber such as a carbon paper or a carbon cloth are generally used.

Any gas-impermeable electrically-conductive plate that is stable in the environment inside the fuel cell can be used for the electrically-conductive oxidizer separator plate 2 and the electrically-conductive fuel separator plate 3. Generally, carbon plates in which gas channel grooves have been formed are used.

A gas seal is constituted by: the electrolyte membrane 6; the oxidizer-sealing support portion 11; the fuel-sealing support portion 12; the interface 13 between the electrolyte membrane 6 and the oxidizer-sealing support portion 11; the interface 14 between the electrolyte membrane 6 and the fuel-sealing support portion 12; the interface 15 between the electrically-conductive oxidizer separator plate 2 and the oxidizer-sealing support portion 11; and the interface 16 between the electrically-conductive fuel separator plate 3 and the fuel-sealing support portion 12, all positioned in the sealing portion 5. Any material having high gas-impermeability that is stable in the environment inside the fuel cell can be used for the gas seal. Because manifold apertures for distributing and supplying gas and cooling liquid to each of the single cells may be disposed in the gas seal, it is necessary for the gas seal also to be stable when in contact with cooling liquids.

In a construction according to the present invention, the oxidizer electrode substrate 9 and the fuel electrode substrate 10 are larger than the power generating portion 4 in order to support the electrolyte membrane 6 from two sides using the two electrode substrates in the sealing portion 5. Since it is not necessary for gases to be supplied to the sealing portion 5, pores of the oxidizer-sealing support portion 11 and the fuel-sealing support portion 12 of the oxidizer electrode substrate 9 and the fuel electrode substrate 10 are filled with a resin material.

In addition, it is necessary for the electrolyte membrane 6 to be larger than at least one of the oxidizer electrode substrate 9 or the fuel electrode substrate 10, and for end portions of the electrolyte membrane 6 to be outside at least end portions of the oxidizer electrode substrate 9 and the fuel electrode substrate 10. This is to prevent electrical short-circuiting conditions between the oxidizer electrode substrate 9 and the fuel electrode substrate 10.

In addition, outer edge portions of the cathode catalyst layer 8 and the anode catalyst layer 7 are filled with a resin. In association with this, the outer edge portions of the cathode catalyst layer 8 and the anode catalyst layer 7 and inner edge portions of the oxidizer-sealing support portion 11 and the fuel-sealing support portion 12 are disposed so as to overlap. When made in this manner, there are no differences in level in the power generating portion 4 due to presence or absence of the catalyst layers 7 and 8, and because stresses due to differences in level are no longer concentrated at the electrolyte membrane 6, rupture of the electrolyte membrane 6 can be suppressed.

A width of overlap at that time need only be greater than or equal to a thickness of the two electrode substrates 9 and 10, and because the electrolyte membrane 6 can be secured sufficiently by the two electrode substrates 9 and 10, damage to the electrolyte membrane 6 can be suppressed and at the same time gas shutoff between the power generating portion 4 and exterior portions can be reliably performed. On the other hand, these effects cannot not sufficiently achieved if the width of overlap is less than the thickness of the two electrode substrates 9 and 10.

However, although the greater the overlap, the more reliably it is possible to hold the electrolyte membrane 6, improvements in effects are no longer seen if the width of the overlap exceeds 5 mm. Similarly, because the reactant gases are not supplied to the overlapping catalyst layers, the amount of non-functioning catalyst increases. From a point of view of reductions in the amount of expensive catalyst used, it is necessary for the width of the overlap between the two to be reduced to within a range enabling rupture of the electrolyte membrane to be suppressed. In other words, it is necessary for the width of the overlap to be set preferably to less than or equal to 5 mm, and even more preferably to less than or equal to 2 mm.

Next, the resin material filling the oxidizer-sealing support portion 11 and the fuel-sealing support portion 12 will be explained. To be used for this purpose, the resin material must be a material having stability in the environment inside the fuel cell, and its gas permeability must be sufficiently low. In particular, it is necessary for it to be a material able to withstand hot water and steam inside the cell for a long period. Furthermore, since it is necessary for interior portions of the electrode substrates 9 and 10 to be filled, fluidity is required during the filling operation.

If the filling resin can bond the oxidizer electrode substrate 9 and the fuel electrode substrate 10 with the electrolyte membrane 6, and the oxidizer electrode substrate 9 and the fuel electrode substrate 10 with the electrically-conductive oxidizer separator plate 2 and the electrically-conductive fuel separator plate 3, the electrolyte membrane 6 can be more uniformly supported by the oxidizer electrode substrate 9 and the fuel electrode substrate 10, and in addition, the electrolyte membrane 6, the oxidizer electrode substrate 9, the fuel electrode substrate 10, the electrically-conductive oxidizer separator plate 2, and the electrically-conductive fuel separator plate 3 can be integrated. Integration in this manner enables handling of single cells of the fuel cell to be facilitated, and gases can be prevented from leaking outside.

If the filling resin has a function of bonding with the electrolyte membrane and the separator plates, etc., the electrolyte membrane can be supported more stably, and in addition, it is possible to integrate it with the separator plates. This integration with the electrolyte membrane and the separator plate, etc., enables handling of fuel cell cells to be facilitated, and gases can be prevented from leaking outside.

If the amount of filling resin occupies greater than or equal to 50 volume percent of the pore volume in the electrode substrate 9 and 10, the resin joins together to form a continuous resin film. In addition, the pores are no longer contiguous, making problems such as gas leaks, etc., less likely to occur. It is even more preferable for the amount of filling resin to be greater than or equal to 90 volume percent and less than 120 volume percent, problems such as gas leaks, etc., being particularly reduced in this range. Excess resin exudes onto outer surfaces of the power generating portion 4 or the membrane electrode composite body 1, seldom causing problems. In excess of 120 volume percent, the amount of exudation of the resin becomes excessive, and problems become conspicuous, such as pores inside the electrode substrate 9 and 10 in the power generating portion 4 becoming sealed by the resin.

Examples of resin materials having the performance described above include fluid resins capable of filling the electrode substrate 9 and 10. A "fluid resin" means a resin having a viscosity that is small enough to penetrate inside the porous bodies during filling. Examples of fluid resins include thermoplastic resins, or thermosetting resins having sufficient fluidity to fill the electrode substrate pores before hardening, etc. Particulate fillers, inorganic or organic, may also be included in these materials as required. Using such fillers, it is possible to impart functions such as control over fluidity, strength after hardening, suppression of hardening contraction, etc.

A thermoplastic resin preferably achieving the fluidity necessary for filling by heating can be used as the material for the filling resin. Operational efficiency is increased when a thermoplastic resin is used, because hardening is possible immediately after the filling operation simply by cooling.

However, if a thermoplastic resin is used, it is necessary for it to be a material that does not flow at the operating temperature of the cell. Consequently, a melting point of the filling resin, at least, must be higher than a maximum operating temperature of the cell. For example, the general operating temperature of a solid polymer fuel cell is 90 degrees Celsius or less, and in a cell of this kind, it is necessary to use a resin that does not flow at 90 degrees Celsius.

If the temperature required for the filling operation of the thermoplastic resin is higher than a heat tolerance threshold of the electrolyte membrane 6, the electrode substrates 9 and 10 must be filled with the resin in advance, before joining the catalyst layers 7 and 8 containing the electrolyte membrane 6 and electrolyte membrane components to the electrode substrates 9 and 10.

Moreover, if the melting point of the thermoplastic resin is lower than the heat tolerance threshold of the electrolyte membrane 6, the electrolyte membrane 6 and the two electrode substrates 9 and 10 can be bonded together and integrated by remelting the thermoplastic resin by heating.

Generally, when manufacturing the membrane electrode composite body 1, the two catalyst layers 7 and 8 and the electrolyte membrane 6 are joined together by hot-pressing. If the melting point of the thermoplastic resin is lower than this joining temperature, the sealing support portions 11 and 12 of the two electrode substrates 9 and 10 and the electrolyte membrane 6 can be bonded together and integrated by the filling resin.

As an example of thermoplastic resins having characteristics of this kind, resins generally known as "hot-melts" can be used satisfactorily. Examples of representative hot-melt resins include polyolefin resins, represented by polyethylene, polypropylene, etc., or resins in which melting temperature and adhesiveness have been improved by copolymerizing polyolefins with polyvinyl acetate, etc. If a polyolefin resin of this kind is used, the resin can be made fluid at a temperature that is sufficiently lower than 200 degrees Celsius, which is the heat tolerance threshold of conventional electrolyte membrane materials. Consequently, the electrode substrates can be filled after the electrolyte membrane components are joined, etc., making the degree of process freedom high. Furthermore, polyolefin resins are comparatively stable materials even if exposed to a high-humidity ambient atmosphere at less than or equal to 90 degrees Celsius, which is the operating temperature of a fuel cell, enabling them to be used satisfactorily.

Examples of thermoplastic resins that can be used similarly include nylon 11, nylon 12, and copolymerized nylon resins. Other examples include polyester resins, represented by polyethylene terephthalate or its copolymers. Since polyester resins of this kind have superior water resistance, they can be used satisfactorily in fuel cells, which are exposed to moisture. Polybutylene resins, polymethyl methacrylate resins, and amorphous polyamide resins can also be similarly used.

If particularly long-term reliability is sought, it is necessary to use a material that is stable in the environment inside the fuel cell. The filling resin is not only exposed to high temperatures and high humidity inside the fuel cell, but may also come into contact with cooling liquid, depending on the fuel cell construction. If the filling resin decomposes and components are eluted, there are risks that the performance of the fuel cell may be degraded, electric conductivity of the cooling liquid may be increased, etc. In such cases, it is necessary to use a material having particularly high chemical stability. In such cases, engineering plastics having superior chemical resistance, represented by polyphenylene sulfide, for example, can be used satisfactorily.

In addition, among polymer alloy resins such as polyvinyl formal-phenolics, nitrile rubber-phenolics, nylon-epoxies, and nitrile rubber-epoxies, solventless types can be used.

In a fuel cell of this kind, because the resin filling the pores is a thermoplastic resin having a melting point that is higher than the maximum temperature during fuel cell operation, it is possible to inject the resin inside the electrode substrates 9 and 10 easily by heating the resin to a temperature greater than or equal to its melting point. At the same time, because the resin will not melt during fuel cell operation, the reliability of the gas seal performance is high.

Resins having sufficient fluidity at an unhardened stage that can later be hardened by reaction with a hardening agent or by heating can also be similarly used for the filling resin. For example, an epoxy resin mixed with a hardening agent can be used by injecting it and then performing a hardening process such as heating, etc. Examples of resin materials that can be similarly used include liquid acrylic rubber resins, silicone resins, phenolic resins, melamine resins, unsaturated polyester resins, polyurethane resins, etc. Furthermore, if hardened silicone resins are used, a membrane electrode composite body 1 can be formed in which adhesiveness towards the electrolyte membrane is high and gas sealing characteristics are superior.

In a fuel cell of this kind, the sealing support portions 11 and 12 of the electrode substrates 9 and 10 are filled with a fluid resin material and then the resin material is later hardened. Using this method, communicating pores in the sealing support portions 11 and 12 of the electrode substrates 9 and 10, mostly constituted by minute pores, can be blocked using the fluid resin even when it is difficult to fill the pores of the electrode substrates 9 and 10 with any other material.

Methods that can be used to fill the electrode substrates 9 and 10 with the thermoplastic resin include injection molding or similar methods, compression molding or similar methods, etc. For example, one method is to place the electrode substrates 9 and 10 in a mold and inject the fluid resin under pressure. A more convenient method that can make the fill rate per unit area uniform is to stack thermoplastic resin sheets having a predetermined thickness with the electrode substrates 9 and 10, and press them in using a hot press. If these resin filling operations are performed under reduced pressure, a resin-filled layer having better gas shutoff characteristics can be achieved because bubbles, etc., are not formed inside the resin-filled layer. The amount of filling resin should be an amount capable of filling the pores inside the electrode substrates 9 and 10 and shutting off gases. The resin filled in this manner can be prepared for use in the membrane electrode composite body 1 by cooling if it is a thermoplastic resin, or by performing a predetermined hardening process if it is a thermosetting resins.

If the electrode substrates 9 and 10 are filled with a thermoplastic resin by first forming the membrane electrode composite body 1, then subsequently stacking the membrane electrode composite body 1 and the two separator plates 2 and 3 and raising the temperature while applying pressure, the introduced thermoplastic resin can be made fluid again, enabling the two separator plates 2 and 3 and the membrane electrode composite body 1 to be integrated. A fuel cell single cell integrated by methods of this kind is integrated all the way from the electrolyte membrane 6 to the two separator plates 2 and 3 by layers of resin using a simple construction, thereby providing a fuel cell single cell that is superior not only in holding stability for the electrolyte membrane 6, but also in reliability of the gas seal and in handling characteristics.

The present invention will now explained in detail with reference to inventive examples.

INVENTIVE EXAMPLE 1

Next, Inventive Example 1 of the fuel cell according to the present invention will be explained. The construction of single cells in the fuel cells of Inventive Example 1 is similar to that in FIG. 1.

Figure 2:
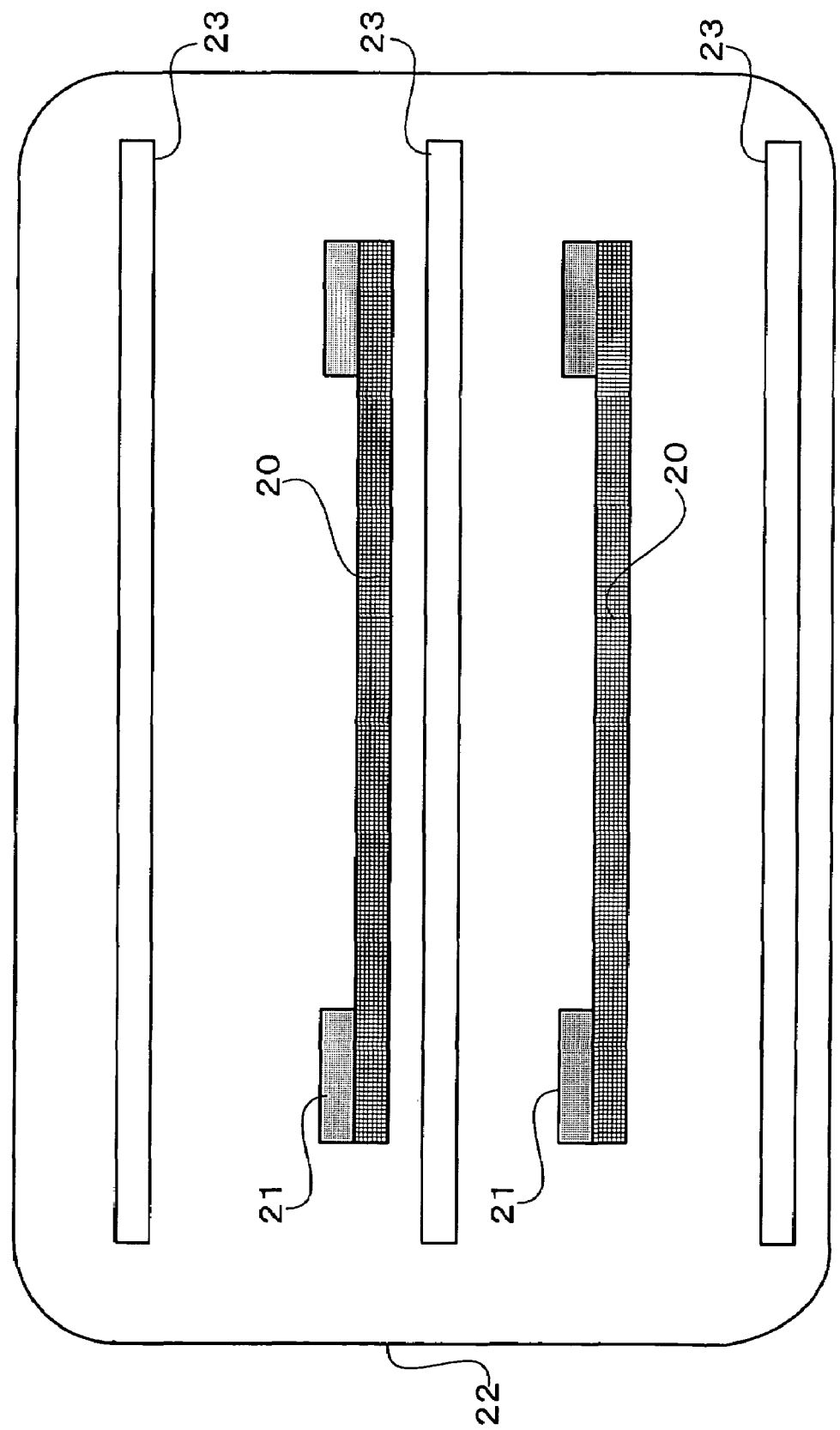
FIG. 2 is a diagram showing a resin film and an electrode substrate plate set in a hot press in order to fill an electrode substrate with a resin.

First, square electrode substrate plate 20 having 90 mm to a side were prepared from a carbon paper having a thickness of 300 µm (TGP-H-90 manufactured by Toray Industries, Inc.). The porosity of this carbon paper was approximately 78 percent. Frame-shaped resin sheets 21 having a square external shape having 90 mm to a side and having a square aperture having 54 mm to a side opened in a central portion were cut out of a resin film having a thickness of 257 µm. As shown in FIG. 2, an oxidizer electrode substrate 9 and a fuel electrode substrate 10 in which an oxidizer-sealing support portion 11 and a fuel-sealing support portion 12 were disposed were produced by stacking these resin sheets 21 with the electrode substrate plates 20, setting them between flat plates 23 of a hot press machine 22, and subsequently filling interior portions of the electrode substrate plates 20 with resin from the resin sheets 21 by hot-pressing them in a vacuum at a temperature of 150 degrees Celsius and a pressure of 49 N/cm$^2$. The volume of the filling resin was approximately 110 volume percent of the pore volume in the electrode substrate plates 20. Here, a polyolefin hot-melt film was used for the resin film. This resin film had a flow initiation temperature of approximately 120 degrees Celsius, and a melt viscosity at 150 degrees Celsius of approximately 40,000 poise. The melting point measured by differential scanning calorimetry (DSC) was approximately 95 degrees Celsius.

Next, anode catalyst particles were produced as an anode catalyst by supporting 50 weight percent platinum on carbon black. Cathode catalyst particles were produced as a cathode catalyst by supporting 50 weight percent platinum-ruthenium alloy on carbon black.

One part by weight water and three parts by weight perfluoric polyelectrolyte solution (Flemion(R) 9% solution manufactured by Asahi Glass Co., Ltd.) were added to one part by weight anode catalyst particles and blended to obtain a uniform anode catalyst paste. One part by weight water and six parts by weight perfluoric polyelectrolyte solution (Flemion(R) 9% solution manufactured by Asahi Glass Co., Ltd.) were added to one part by weight cathode catalyst particles and blended to obtain a uniform cathode catalyst paste.

These catalyst pastes were screen-printed onto central portions of the oxidizer electrode substrate 9 and the fuel electrode substrate 10, respectively, and dried under reduced pressure to obtain an anode catalyst layer 7 and a cathode catalyst layer 8. A screen mask was used in the printing such that the printed shape was a square having 50 mm to a side.

Figure 3:
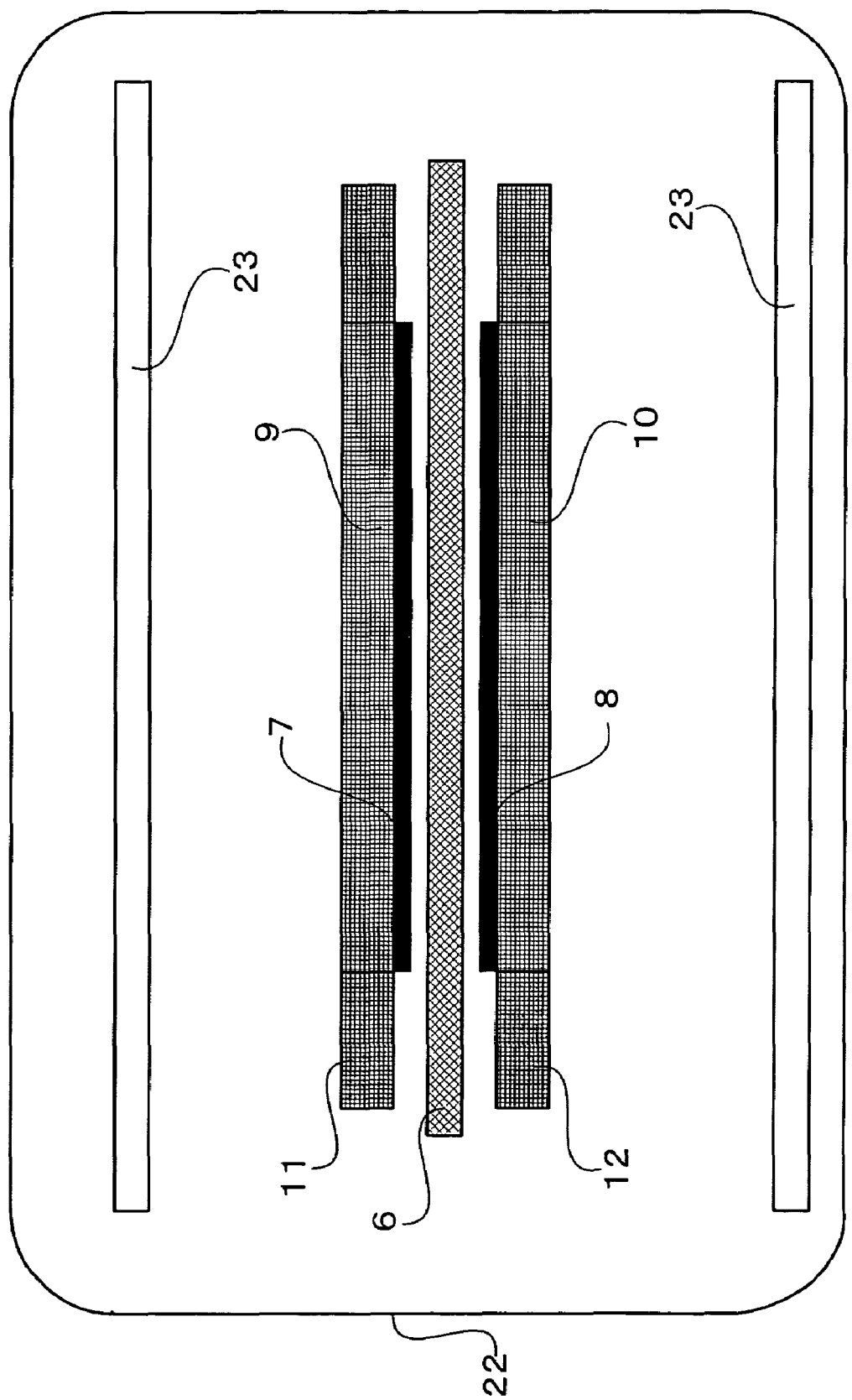
FIG. 3 is a diagram showing a membrane electrode composite body being produced in a hot press.

Next, preparation of the membrane electrode composite body 1 will be explained with reference to FIG. 3. A stacked body was produced by stacking a fuel electrode substrate 10 on which a cathode catalyst layer 8 was formed and an oxidizer electrode substrate 9 on which an anode catalyst layer 7 was formed centrally on an electrolyte membrane 6 such that the cathode catalyst layer 8 and the anode catalyst layer 7 faced each other. Next, this stacked body was hot-pressed at a temperature of 150 degrees Celsius and a pressure of 49 N/cm$^2$ for five minutes to form the membrane electrode composite body 1. A square having 100 mm to a side cut out of an Aciplex (registered trademark) film manufactured by Asahi Chemical Industry Co., Ltd. having a thickness of 50 μm was used for the electrolyte membrane 6. By using an electrolyte membrane 6 that was larger than the fuel electrode substrate 10 and the oxidizer electrode substrate 9 in this manner, and making the construction such that the electrolyte membrane 6 projected out beyond edge portions of the fuel electrode substrate 10 and the oxidizer electrode substrate 9, the fuel electrode substrate 10 and the oxidizer electrode substrate 9 were prevented from contacting each other directly and short-circuiting. Since the resin filling the fuel electrode substrate 10 and the oxidizer electrode substrate 9 was remelted and bonded together with the electrolyte membrane 6 by the hot-pressing operation, the electrolyte membrane 6 was integrated with the fuel electrode substrate 10 and the oxidizer electrode substrate 9 firmly, and gas shutoff was made more reliable.

Figure 4:
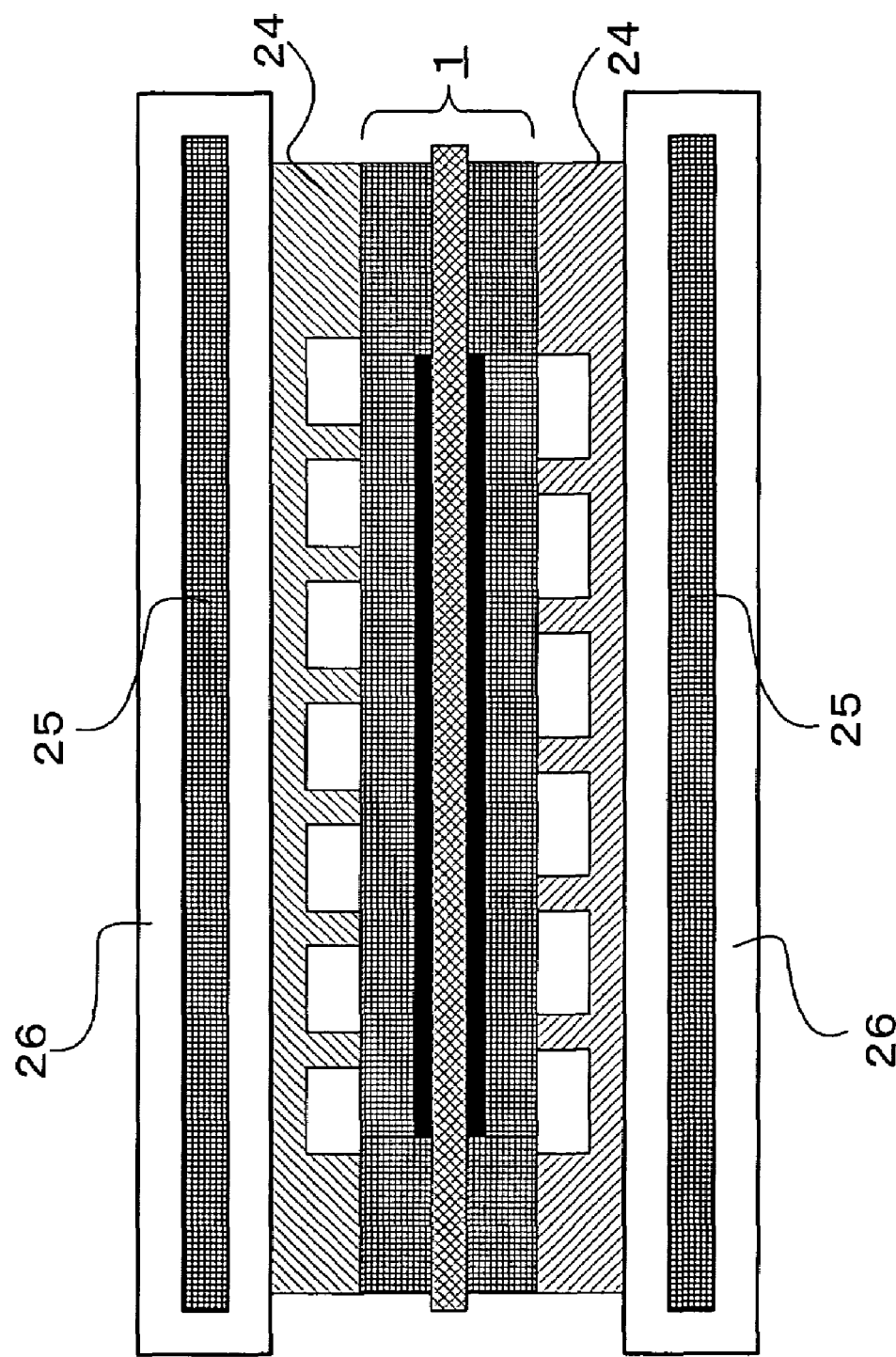
FIG. 4 is a cross section of an evaluation cell.

Next, as shown in FIG. 4, evaluation cells for performance evaluations were formed by sandwiching the membrane electrode composite body 1 between carbon plates 24 in which gas channels were disposed, and applying surface pressure from outside using metal plates 26 having built-in heating elements 25. External terminals (not shown) were led out of the metal plates 26, and connected to an external load (not shown).

Next, evaluation was performed by running the evaluation cells. Power generation was performed by connecting the input and output terminals of the evaluation cells to an external load, and supplying hydrogen gas at normal pressure to the cathode, and air at normal pressure to the anode. Flow rates were set such that the utilization factor of the hydrogen gas was seventy percent, and the oxygen utilization factor of the air was forty percent. The gases were humidified using external humidifiers (not shown) before being supplied to the evaluation cells. Temperature was regulated by heating the heating elements 25 such that the temperature of the evaluation cells was 80 degrees Celsius. Concerning the humidity of the supplied gases, the evaluation cells were operated under conditions in which gases having a dew point of 80 degrees Celsius were supplied to both the cathode and the anode only for 12 hours after commencement of operation to make ion conduction resistance in the electrolyte membrane 6 sufficiently low. Thereafter, the external humidifiers were regulated so as to maintain a dew point of 75 degrees Celsius. Then, these evaluation cells were operated continuously for 2,000 hours at an electric current density of 300 mA/cm$^2$. In this performance evaluation, fifteen evaluation cells were made to equivalent specifications, and each run under respective operating conditions.

Five of the evaluation cells made for Inventive Example 1 each showed an output voltage in excess of 700 mV as a characteristic of an initial stage approximately 50 hours after commencement of operation, the mean value of the five output voltages being 704 mV. When these evaluation cells were subsequently operated continuously, the voltages gradually decreased. It was decided that any cell whose voltage became less than 500 mV during operation up to 2,000 hours would be deemed to have reached the end of its service life, and operation would be terminated. In Inventive Example 1, there were actually no evaluation cells below 500 mV by 2,000 hours. After completion of 2,000 hours of operation, the membrane electrode composite bodies 1 were extracted from the evaluation cells, and the state of each electrolyte membrane 6 was observed using a microfocus X-ray inspection apparatus, but no abnormalities such as damage to the electrolyte membrane 6, etc., were found. These results are shown in FIG. 5.

In addition, evaluation was performed on five evaluation cells in a repeated operating pattern of continuous running for eight hours under conditions having an electric current density of 300 mA/cm$^2$ and stopping for 16 hours. This case simulated "DSS" (Daily Startup and Shutdown) operation. It was decided that any cell whose output voltage became less than 500 mV before 2,000 hours would be deemed to have reached the end of its service life, and operation would be terminated. There were actually no cells with an output voltage below 500 mV by 2,000 hours. After completion of 2,000 hours of operation, the membrane electrode composite bodies 1 were extracted from the evaluation cells, and the state of each electrolyte membrane 6 was observed using a microfocus X-ray inspection apparatus, but no abnormalities such as damage to the electrolyte membrane 6, etc., were found. These results are shown in FIG. 5.

In addition, gases humidified so as to have a dew point of 60 degrees Celsius were supplied to five evaluation cells 12 hours after startup for both anode humidification and cathode humidification. This is "low-humidity" operation. It was decided that any cell whose voltage became less than 500 mV before 2,000 hours would be deemed to have reached the end of its service life, and operation would be terminated. There was actually one evaluation cell with an output voltage below 500 mV by 2,000 hours. After completion of 2,000 hours of operation, the membrane electrode composite bodies 1 were extracted from the evaluation cells, and the state of each electrolyte membrane 6 was observed using a microfocus X-ray inspection apparatus, but no abnormalities such as damage to the electrolyte membrane 6, etc., were found. These results are shown in FIG. 5.

Figure 6:
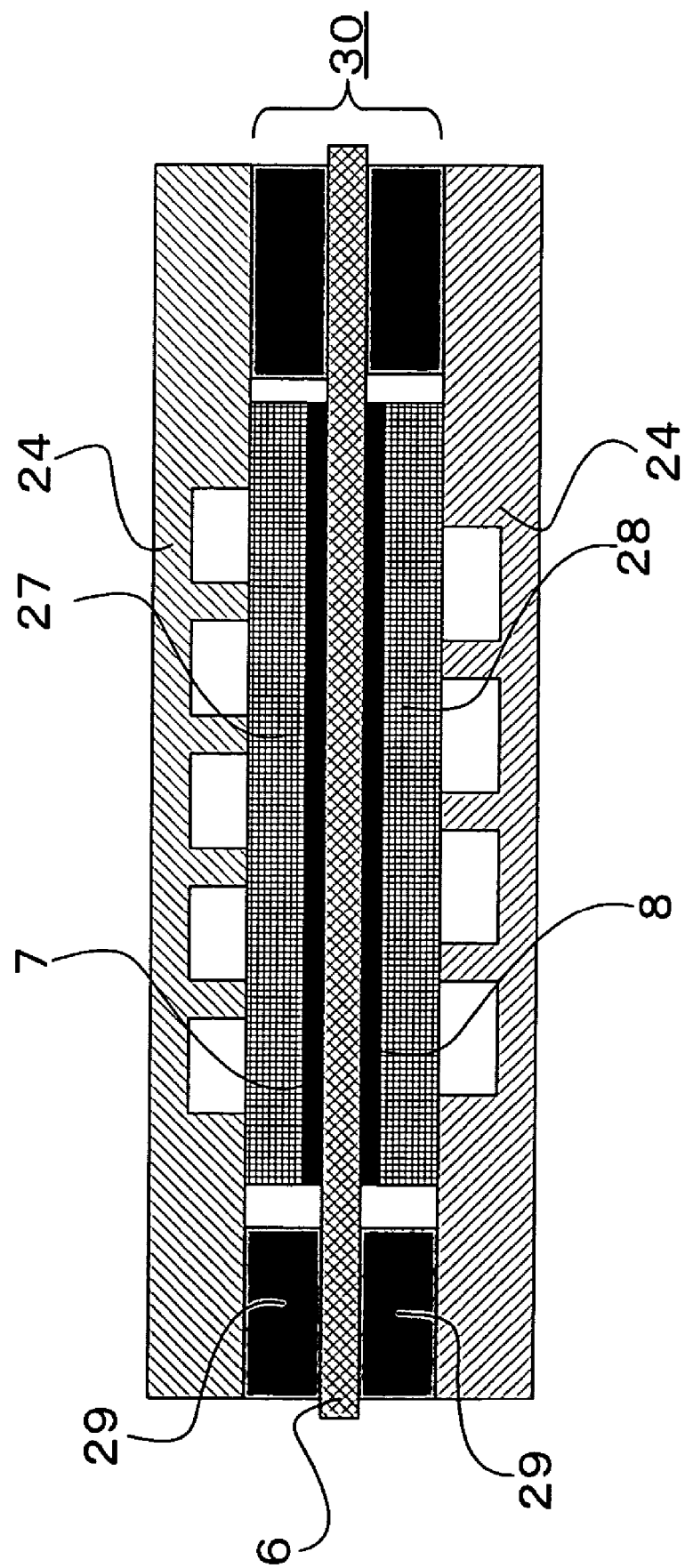
FIG. 6 is a cross section of a fuel cell according to a comparative example.

Now, comparative example fuel cells such as that shown in FIG. 6 were produced for comparison. An anode catalyst layer 7 and cathode catalyst layer 8 were formed on an oxidizer electrode substrate 27 and a fuel electrode substrate 28 in a similar manner to those of Inventive Example 1. The size and shape of this anode catalyst layer 7 and cathode catalyst layer 8 was a square having 50 mm to a side. However, the size and shape of the oxidizer electrode substrate 27 and the fuel electrode substrate 28 differed from that of Inventive Example 1, being a square identical in size to the anode catalyst layer 7 and the cathode catalyst layer 8 having 50 mm to a side. However, the thickness and the porosity were the same as those of Inventive Example 1. Gaskets 29 were prepared by cutting a frame shape having a square external shape having 90 mm to a side and a square aperture having 51 mm to a side opened at a central portion thereof out of a polyethylene terephthalate film having a thickness of 250 μm. An electrolyte membrane 6 identical to that of Inventive Example 1 was also prepared.

This fuel electrode substrate 28 and oxidizer electrode substrate 27 were stacked on a central portion of a square electrolyte membrane 6 having 100 mm to a side such that the cathode catalyst layer 8 and the anode catalyst layer 7 faced each other. In addition, the gaskets 29 were stacked on outer edge portions of the electrolyte membrane 6. A membrane electrode composite body 30 was formed by hot-pressing these stacked members together for five minutes at a temperature of 150 degrees Celsius and a pressure of 49 N/cm$^2$. Next, evaluation cells for performance evaluations were produced by sandwiching this membrane electrode composite body 30 between carbon plates 24 in which gas channels were disposed, and applying surface pressure using metal plates 26 having built-in heating elements 25 from exterior portions thereof, in a similar manner to those of FIG. 4.

Next, evaluation was performed by running the comparative example evaluation cells under conditions identical to those of the evaluation cells of Inventive Example 1.

Five of the comparative example evaluation cells each showed an output voltage in excess of 700 mV as a characteristic of an initial stage approximately 50 hours after commencement of continuous operation. When these evaluation cells were subsequently operated continuously, the voltages gradually decreased. There was actually one evaluation cell with an output voltage below 500 mV by 2,000 hours. After completion of 2,000 hours of operation, the membrane electrode composite bodies 30 were extracted from the evaluation cells, and the state of each electrolyte membrane 6 was observed using an X-ray radiographic inspection apparatus, but no abnormalities such as damage to the electrolyte membrane 6, etc., were found. These results are shown in FIG. 5.

Next, DSS operation was performed on five of the comparative example evaluation cells in a similar manner to Inventive Example 1. There were three with a voltage of less than 500 mV by 2,000 hours. The state of each electrolyte membrane 6 was subsequently observed using a microfocus X-ray inspection apparatus, and damage to the electrolyte membrane 6 was confirmed in two of the evaluation cells. These results are shown in FIG. 5.

Next, low-humidity operation at a dew point of 60 degrees Celsius for the humidifying conditions of the two electrodes was performed on five of the comparative example evaluation cells in a similar manner to Inventive Example 1. As a result, all of the evaluation cells had an output voltage of less than 500 mV by 2,000 hours. The state of each electrolyte membrane 6 was subsequently observed using a microfocus X-ray inspection apparatus, and damage to the electrolyte membrane 6 was confirmed in four of the evaluation cells. These results are shown in FIG. 5.

Next, the evaluation cells of Inventive Example 1 were also operated under high-humidity conditions, and no damage to the electrolyte membrane 6 was found even after 2,000 hours. In addition, there were no evaluation cells with an output voltage below 500 mV even after 2,000 hours. On the other hand, when the comparative example fuel cells were operate under high-humidity conditions, no damage to the electrolyte membrane 6 was found after 2,000 hours, but evaluation cells in which the output voltage was less than 500 mV were found.

To summarize these evaluation results, in the fuel cell according to the present invention, the electrolyte membrane 6 was not damaged, and the output voltage did not decrease greatly, even under operating conditions in which the temperature of the membrane electrode composite body 1 or its internal moisture content repeatedly fluctuates greatly, such as in DSS operation.

In addition, even under operating conditions in which the moisture content of the electrolyte membrane 6 decreases and the membrane is easily damaged, such as in low-humidity operation, there were no membrane electrode composite bodies 1 in which the electrolyte membrane 6 was damaged.

In a fuel cell of this kind, because outer edge portions of the electrode substrates 9 and 10 are filled with resin, the electrolyte membrane 6 will not be damaged at joint portions since there are no joints in the members supporting the electrolyte membrane 6. As a result, even if operated using low-humidity gases, or operated under severe conditions such as repeated operation and stopping, performance deterioration can be suppressed.

Because the electrode substrates 9 and 10 and the electrolyte membrane 6 are bonded together by the resin filling the sealing support portions 11 and 12, gases will not leak outside through gaps between the electrolyte membrane 6 and the electrode substrates 9 and 10. In addition, since the electrolyte membrane 6 and the electrode substrates 9 and 10 are integrated, handling is facilitated during manufacturing.

Since the electrolyte membrane 6 is held more actively from two sides, the resin filling the outer edge portions of the electrode substrates 9 and 10 bonds together the electrolyte membrane 6 and the electrode substrates 9 and 10. Thus, the electrolyte membrane 6 in the power generating portion 4 is fixed from two sides, suppressing deformation and concentrations of stress more effectively. If the two were not fixed by binding, securing of the electrolyte membrane 6 would not be satisfactory at portions where the surface pressure is locally low, and there is a risk that this would lead to damage.

Because the power generating portion and the sealing portion are separated not by the presence or absence of the anode catalyst layer 7 and the cathode catalyst layer 8, but rather by the presence or absence of the filling resin, deformation and concentrations of stress in the electrolyte membrane at the boundary thereof can be suppressed more effectively.

INVENTIVE EXAMPLE 2

Figure 7:
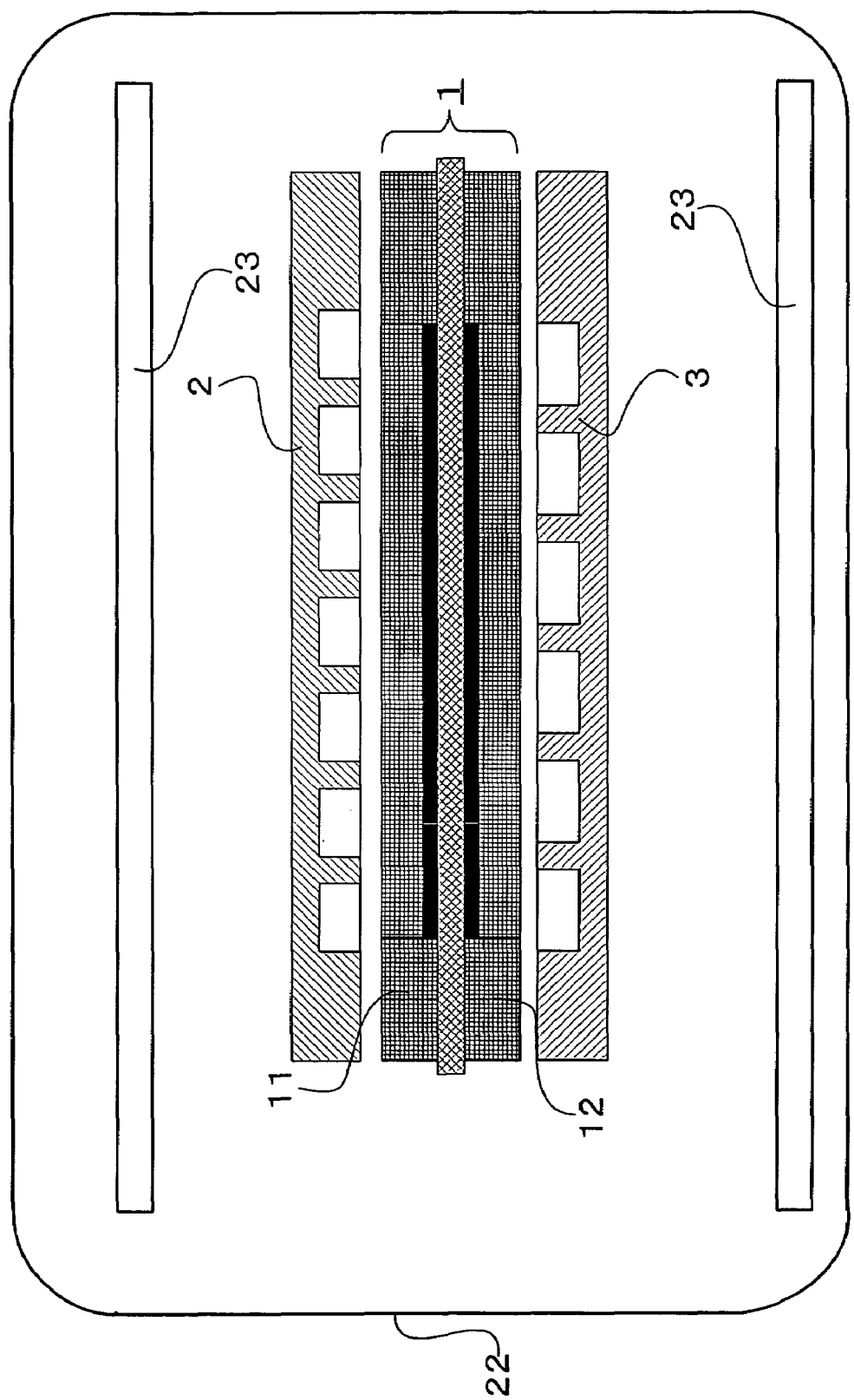
FIG. 7 is a diagram showing the membrane electrode composite body and separator plates being bonded together in a hot press.

FIG. 7 is a cross section of a single cell of a fuel cell according to Inventive Example 2 of the present invention. In this single cell, a membrane electrode composite body 1 was formed in a similar manner to that of Inventive Example 1. This membrane electrode composite body 1 was subsequently sandwiched between an electrically-conductive oxidizer separator plate 2 and an electrically-conductive fuel separator plate 3 in which gas channels were disposed to form a single cell stacked body. Hot-pressing was applied to this single cell stacked body for two minutes at a temperature of 120 degrees Celsius and a pressure of 49 N/cm$^2$. By this process, thermoplastic resin filling an oxidizer-sealing support portion 11 and a fuel-sealing support portion 12 was re-softened, bonding the electrically-conductive oxidizer separator plate 2 and the electrically-conductive fuel separator plate 3 with the membrane electrode composite body 1 to produce the single cell.

Next, evaluation of this single cell was performed by applying surface pressure from outside using metal plates 26 having heating elements 25 built in, in a similar manner to those of FIG. 4. Pressure was applied to this single cell from outside by springs such that there was 49 N/cm$^2$ of pressure over the entire surface area of the membrane electrode composite body 1. In this state, nitrogen gas was passed through gas channels communicating with the fuel electrode, an inlet gas flow rate being regulated using a mass flow controller such that a gas inlet side was at 200 mm of water column pressure. A gas outlet flow rate was measured in this state, and a leak rate was estimated. Results showed that the gas did not leak out.

Next, in order to confirm the effects of hot-pressing at a temperature of 120 degrees Celsius, a membrane electrode composite body 1 was sandwiched between an electrically-conductive oxidizer separator plate 2 and an electrically-conductive fuel separator plate 3 in which gas channels were disposed, then evaluation of this single cell was performed without hot-pressing, so as to be different from Inventive Example 2, by applying surface pressure from outside using metal plates 26 having heating elements 25 built in. Pressure was applied to the single cell produced in this manner from outside by springs such that there was 49 N/cm$^2$ of pressure over the entire surface area of the membrane electrode composite body 1. In this state, nitrogen gas was passed through gas channels communicating with the fuel electrode, an inlet gas flow rate being regulated using a mass flow controller such that a gas inlet side was at 200 mm of water column pressure. A gas outlet flow rate was measured in this state, and a leak rate was estimated. As a result, it was found that approximately 7 percent of the gas leaked outside the fuel electrode. Furthermore, since the two separator plates 2 and 3 and the membrane electrode composite body 30 of the single cell formed in this manner were not integrated, assembly work, etc., was more difficult than in the case of Inventive Example 2.

Other evaluation was also performed in order to confirm the effects of hot-pressing at a temperature of 120 degrees Celsius. A membrane electrode composite body 1 was formed in a similar manner to that of Inventive Example 1. This membrane electrode composite body 1 was subsequently sandwiched between two electrically-conductive separator plates 2 and 3 in which gas channels were disposed, and the stacked body was set in a jig that applied pressure by springs. Pressure was applied to this stacked body from outside by the springs such that there was 49 N/cm$^2$ of pressure over the entire surface area of the membrane electrode composite body 1. In this state, nitrogen gas was passed through gas channels communicating with an electrode of the stacked body, a gas flow rate being regulated such that a gas inlet side was at 200 mm of water column pressure. A gas outlet flow rate was measured in this state, and a leak rate was estimated, results showing that approximately 12 percent of the gas leaked outside. The entire jig was placed in this state into an oven set to 120 degrees Celsius, kept there for two hours, and subsequently cooled. After cooling, the amount of compression in the springs was adjusted so as to achieve the above pressure again, and when gas leakage was measured again by the above method, the gas no longer leaked out.

By stacking the membrane electrode composite body 1 and the two separator plates 2 and 3 and making the thermoplastic resin filling portions of the electrode substrates 9 and 10 soft again by heating in this manner, it is possible to join together the two separator plates 2 and 3 and the membrane electrode composite body 1. Furthermore, satisfactory gas sealing properties in which gas does not leak out are achieved by this joining.

By integrating the membrane electrode composite body 1 and the two separator plates 2 and 3, assembly operations for the single cells are facilitated, and gas sealing properties are improved.

Since the resin is softened with the single cell stacked and surface pressure applied, the single cell is naturally fixed in its most stable shape and position. For that reason, improved gas sealing properties are achieved.

In a fuel cell of this kind, because the electrode substrates 9 and 10 and the two separator plates 2 and 3 are bonded together by the resin filling the sealing support portions 11 and 12, gases will not leak outside through gaps between the two separator plates 2 and 3 and the electrode substrates 9 and 10. In addition, because the two separator plates 2 and 3 and the membrane electrode composite body 1 are integrated, handling is facilitated during manufacturing.

Because the resin filling the sealing support portions 11 and 12 of the electrode substrates 9 and 10 is connected between the electrolyte membrane 6 and the two separator plates 2 and 3, there is airtightness between the electrode substrates 9 and 10 and the electrolyte membrane 6, and between the electrode substrates 9 and 10 and the separator plates 2 and 3, preventing gases from leaking outside.

INVENTIVE EXAMPLE 3

Inventive Example 3 differs from Inventive Example 1 in the thickness of the resin sheets for supplying the filling resin; the rest is similar and explanation of the similar portions will be omitted. Two types of resin sheet having thicknesses of 212 μm and 164 μm, respectively, were used to adjust the amount of filling resin so as to occupy approximately 90 volume percent and 50 volume percent of the pore volume in the electrode substrates 9 and 10. These membrane electrode composite bodies 1 were each subsequently sandwiched between electrically-conductive oxidizer separator plate 2 and an electrically-conductive fuel separator plate 3 in which gas channels were disposed, and hot-pressed for two minutes at 120 degrees Celsius. By this process, thermoplastic resin filling sealing support portions 11 and 12 of the oxidizer electrode substrate 9 and the fuel electrode substrate 10 was re-softened, bonding the electrically-conductive oxidizer separator plate 2 and the electrically-conductive fuel separator plate 3 with the membrane electrode composite body 1. The single cells were each subsequently set in a jig that applied pressure by springs. Pressure was applied from outside by the springs such that there was 49 N/cm$^2$ of pressure over the entire surface area of the membrane electrode composite bodies 1. In this state, nitrogen gas was passed through gas channels communicating with the fuel electrode (cathode), an inlet gas flow rate being regulated using a mass flow controller such that a gas inlet side was at 200 mm of water column pressure. A gas outlet flow rate was measured in this state, and a leak rate was estimated. Results showed that when the amount of filling resin was 90 volume percent, there was almost no gas leakage, and when the amount of filling resin was 50 volume percent, approximately 2 percent of the gas leaked outside the fuel electrode, but these single cells were sufficiently usable for practical purposes.

Next, in order to compare the amount of resin per unit pore volume inside the electrode substrates 9 and 10, evaluation was performed with the thickness of the resin sheets reduced. The thickness of the filling resin sheet was set to 140 μm. The amount of filling resin was adjusted so as to occupy approximately 40 volume percent of the pore volume in the electrode substrates. This membrane electrode composite body 1 was subsequently sandwiched between electrically-conductive oxidizer separator plate 2 and an electrically-conductive fuel separator plate 3 in which gas channels were disposed, and hot-pressed for two minutes at 120 degrees Celsius. By this process, thermoplastic resin filling sealing support portions 11 and 12 of the oxidizer electrode substrate 9 and the fuel electrode substrate 10 was re-softened, bonding the electrically-conductive oxidizer separator plate 2 and the electrically-conductive fuel separator plate 3 with the membrane electrode composite body 1. The single cell was subsequently set in a jig that applied pressure by springs. Pressure was applied from outside by the springs such that there was 49 N/cm$^2$ of pressure over the entire surface area of the membrane electrode composite body 1. In this state, nitrogen gas was passed through gas channels communicating with the fuel electrode, an inlet gas flow rate being regulated using a mass flow controller such that a gas inlet side was at 200 mm of water column pressure. A gas outlet flow rate was measured in this state, and a leak rate was estimated. Results showed that approximately 18 percent of the gas leaked outside the fuel electrode, making the single cell unusable for practical purposes.

Thus, if the pores of the electrode substrates 9 and 10 are not filled by at least greater than or equal to 50 volume percent by the resin, the gas seals between the electrically-conductive oxidizer separator plate 2 and the oxidizer electrode substrate 9 and between the electrically-conductive fuel separator plate 3 and the fuel electrode substrate 10 will not be satisfactory. More preferably, if filled by greater than or equal to 90 volume percent, the possibility of gas leakage is greatly reduced.

INVENTIVE EXAMPLE 4

Figures 8, 9:
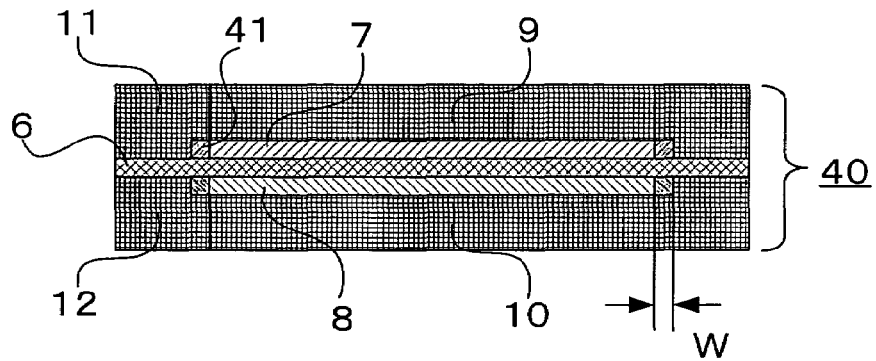
FIG. 8 is a cross section of a membrane electrode composite body according to Inventive Example 4 of the present invention.
FIG. 9 is a table showing open circuit voltage at commencement of power generation and after 2,000 hours in relation to bonding width.

FIG. 8 is a cross section of a membrane electrode composite body according to Inventive Example 4 of the present invention.

Membrane electrode composite bodies 40 according to Inventive Example 4 differ from the membrane electrode composite bodies 1 of Inventive Example 1 in external dimensions of an electrolyte membrane 6, a fuel electrode substrate 10, an oxidizer electrode substrate 9, an anode catalyst layer 7, and a cathode catalyst layer 8; because the rest is similar, explanation of the similar portions will be omitted. The external shape of the electrolyte membrane 6, the fuel electrode substrate 10, and the oxidizer electrode substrate 9 was a square having 60 mm to a side. The external shape of the anode catalyst layer 7 and the cathode catalyst layer 8 was a square having 50 mm to a side.

For the fuel-sealing support portion 12 and the oxidizer-sealing support portion 11, shapes having six different values for internal dimensions were prepared. These internal dimensions were smaller than the external dimensions of the cathode catalyst layer 8 and the anode catalyst layer 7 by 0.4 mm, 1.0 mm, 2.0 mm, 6.0 mm, 10.0 mm, and 14.0 mm, respectively.

In addition, in the anode catalyst layer 7 and the cathode catalyst layer 8, frame-shaped outer edge portions 41 from an outer periphery inward were filled with resin. Internal dimensions of these outer edge portions 41 were equal to the internal dimensions of the fuel-sealing support portion 12 and the oxidizer-sealing support portion 11.

The anode catalyst layer 7 and the cathode catalyst layer 8 were bonded with the electrolyte membrane 6 from two sides at the outer edge portions 41 filled with the resin. Frame-shaped bonding widths W were 0.2, 0.5, 1.0, 3.0, 5.0, and 7.0 mm. Moreover, the fuel-sealing support portion 12 and the oxidizer-sealing support portion 11 were bonded with the electrolyte membrane 6 in a similar manner to those of Inventive Example 1.

Moreover, the fuel-sealing support portion 12, the oxidizer-sealing support portion 11, and the outer edge portions 41 were filled with resin by first cutting out polyester resin sheets in frame shapes in a similar manner to Inventive Example 1, sandwiching the electrolyte membrane 6 from two sides between the fuel electrode substrate 10 on which the cathode catalyst layer 8 were already formed and the anode catalyst layer 7 on which the oxidizer electrode substrate 9 was already formed, with the polyester resins sheets therebetween, and hot-pressing to fill them with the resin. When 180-degree peel strength was measured by tearing the electrolyte membrane 6 from the fuel-sealing support portion 12 and the oxidizer-sealing support portion 11, the peel strength per centimeter of width was approximately 1.2 N/cm.

Next, five single cells were produced for each of the bonding widths W in a similar manner to Inventive Example 1 using these membrane electrode composite bodies 40, and continuous power generation was performed for 2,000 hours. FIG. 9 shows (a mean value for five) open circuit voltages at commencement of power generation and after 2,000 hours for each of the bonding widths W.

As can be seen from FIG. 9, when the bonding width W was narrower than 0.5 mm, peeling occurred between the two catalyst layers 7 and 8 and the electrolyte membrane 6 at the outer edge portions 41 of the two catalyst layers 7 and 8 during continuous power generation for 2,000 hours, and open circuit voltage decreased due to damage caused by concentrations of stress in the electrolyte membrane 6. Furthermore, when the bonding width W is wider than 5.0 mm, since the surface area of the catalyst layers 7 and 8 filled with the resin is increased, the fuel or oxidizer do not penetrate these regions, restricting the surface area of the catalyst layers performing the electrochemical reactions, and reducing the load voltage at commencement of power generation. Thus, it is preferable for the bonding width W to be greater than or equal to 0.5 mm and less than or equal to 5.0 mm.

Thus, because concentrations of stress resulting from differences in humidity in the electrolyte membrane during operation of the fuel cell are alleviated and the catalyst layers, the electrode substrates, and the electrolyte membrane are integrated by bonding the outer edge portions of the catalyst layers and the electrolyte membrane together using resin, peeling of the catalyst layers, damage to the electrolyte membrane, peeling at the interface between the electrolyte membrane and the catalyst layers, etc., do not occur, achieving a fuel cell having stable electric power output characteristics.

INVENTIVE EXAMPLE 5

Figure 10:
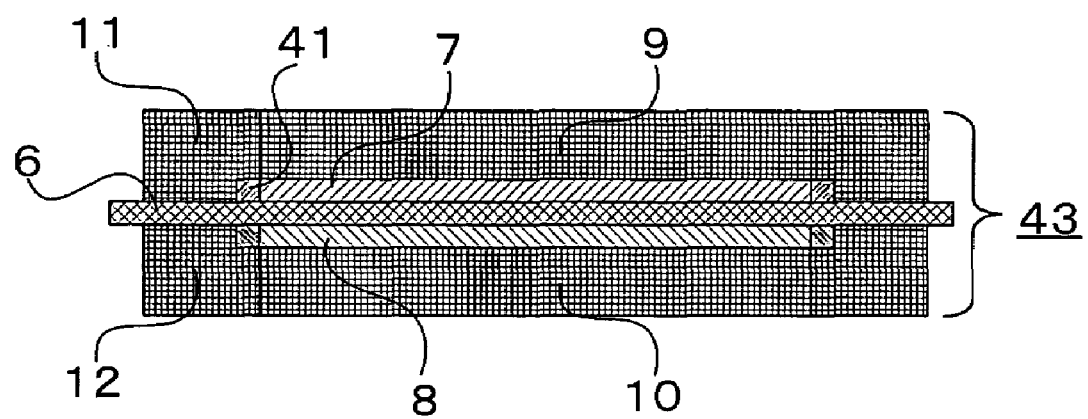
FIG. 10 is a cross section of a membrane electrode composite body according to Inventive Example 5 of the present invention.

FIG. 10 is a cross section of a membrane electrode composite body according to Inventive Example 5 of the present invention.

A membrane electrode composite body 43 according to Inventive Example 5 differed from the membrane electrode composite bodies 40 of Inventive Example 4 in that external dimensions of a fuel electrode substrate 10 and an oxidizer electrode substrate 9 were smaller than an electrolyte membrane 6; because the rest is similar, the similar portions will be given identical numbering and explanation thereof omitted. Moreover, bonding width W in the outer edge portions 41 was 1 mm.

The external shape of the fuel electrode substrate 10 and the oxidizer electrode substrate 9 was a square having 58 mm to a side.

If the external shape of the fuel electrode substrate 10 and the oxidizer electrode substrate 9 is equal to the external shape of the electrolyte membrane 6, as in Inventive Example 4, if a misalignment occurs while filling the fuel electrode substrate 10 and the oxidizer electrode substrate 9 with the resin when bonding the electrolyte membrane 6, portions may be created where the fuel electrode substrate 10 or the oxidizer electrode substrate 9 protrudes further outward than an outer peripheral portion of the electrolyte membrane 6. Since the electrolyte membrane 6 is thin, having a thickness of 50 μm, if the fuel electrode substrate 10 and the oxidizer electrode substrate 9 protrude at identical positions, there is a risk that the two electrode substrates may come into contact and form a short circuit.

In the membrane electrode composite body 43 of Inventive Example 5 constructed in this manner, because the two electrode substrates 9 and 10 will not protrude further outward than outer peripheral portions of the electrolyte membrane 6 even if a misalignment occurs when bonding and filling with the resin, the two electrode substrates can be prevented from coming into contact and forming a short circuit.

Moreover, in Inventive Example 5, the fuel electrode substrate 10 and the oxidizer electrode substrate 9 used both had dimensions smaller than the electrolyte membrane 6, but similar effects can also be achieved by making the dimensions of only one of either the fuel electrode substrate 10 or the oxidizer electrode substrate 9 smaller.

INVENTIVE EXAMPLE 6

Figure 11:
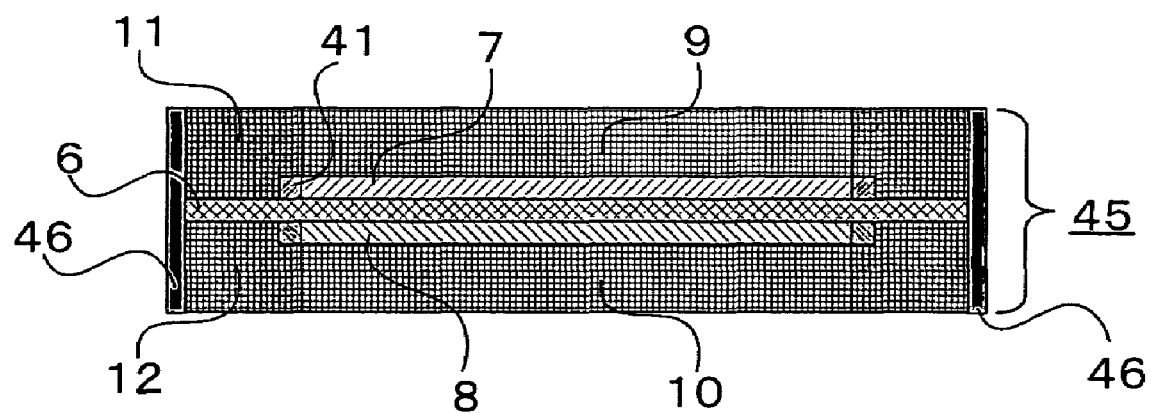
FIG. 11 is a cross section of a membrane electrode composite body according to Inventive Example 6 of the present invention.

FIG. 11 is a cross section of a membrane electrode composite body according to Inventive Example 6 of the present invention.

A membrane electrode composite body 45 according to Inventive Example 6 differed from the membrane electrode composite bodies 40 of Inventive Example 4 in that side and end surfaces of the membrane electrode composite body 45 were covered by a resin 46; because the rest is similar, the similar portions will be given identical numbering and explanation thereof omitted.

In Inventive Example 6, filling of the resin was performed using polyester resin sheets cut into a frame-shaped external shape having 65 mm to a side.

If a bonding surface between the electrolyte membrane 6 and the fuel electrode substrate 10 or the oxidizer electrode substrate 9 communicates with exterior portions, there is a risk that the fuel or the oxidizer may leak out via the bonding surface between the electrolyte membrane 6 and the fuel electrode substrate 10 or the oxidizer electrode substrate 9 when the fuel cell is constructed and electric power generation is performed.

However, if outer edge portions of the electrode substrates 9 and 10 are filled with a resin using polyester resin sheets that are larger than the external dimensions of the electrolyte membrane 6, because the resin covers all of the outer end surfaces of the electrode substrates 9 and 10 and the electrolyte membrane 6, when power generation is performed, stable power generation having no gas leaks can be performed because end portions of the bonding surfaces between the electrolyte membrane 6 and the fuel electrode substrate 10 or the oxidizer electrode substrate 9 are surrounded by the resin and do not communicate with exterior portions.

INVENTIVE EXAMPLE 7

Figure 12:
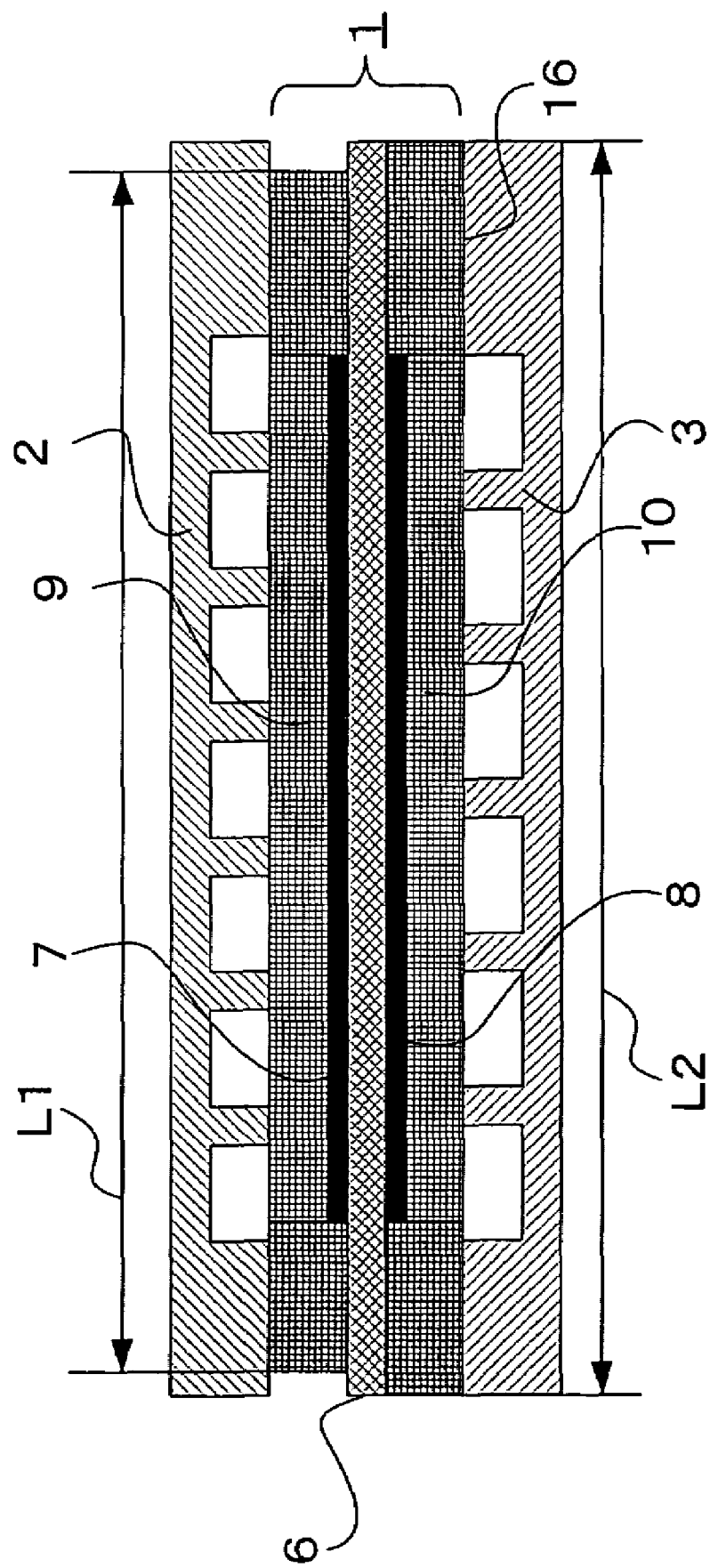
FIG. 12 is a cross section of a single cell according to Inventive Example 7 of the present invention.

FIG. 12 is a cross section of a single cell according to Inventive Example 7 of the present invention. Dimensions of an oxidizer electrode substrate 9 and an electrolyte membrane 6 of Inventive Example 7 differed from those of Inventive Example 1; because the rest is similar, the similar portions will be given identical numbering and explanation thereof omitted. An external shape of the oxidizer electrode substrate 9 of Inventive Example 7 was a square having 87 mm to a side (L1), and the shape of the electrolyte membrane 6 was a square having 90 mm to a side (L2). Moreover, the shape of a fuel electrode substrate 10 was the same as that of Inventive Example 1, namely a square having 90 mm to a side. When this oxidizer electrode substrate 9 and this fuel electrode substrate 10 were stacked with the electrolyte membrane 6 and joined together by hot-pressing, the oxidizer electrode substrate 9, the fuel electrode substrate 10, and the electrolyte membrane 6 were positioned such that centers thereof aligned. In other words, the fuel electrode substrate 10 and the electrolyte membrane 6, which are equal in size, were stacked such that outer peripheries thereof were aligned, and in addition, outer peripheral end portions of the oxidizer electrode substrate 9 were positioned 1.5 mm inside outer peripheral end portions of the electrolyte membrane 6. When outer peripheral portions of the membrane electrode composite body 1 were observed visually after joining, end portions of the oxidizer electrode substrate 9 were further inward than end portions of the electrolyte membrane 6, and the two electrodes did not directly contact each other anywhere. This membrane electrode composite body 1 was operated using methods similar to those of Inventive Example 1, and output voltage measured at a point in time 50 hours after startup was 705 mV.

In Inventive Example 1, external dimensions of the oxidizer electrode substrate 9 and the fuel electrode substrate 10 were smaller than external dimensions of the electrolyte membrane 6. In addition, in Inventive Example 7, the external dimensions of the oxidizer electrode substrate 9 were smaller than the external dimensions of the electrolyte membrane 6. Then, fuel cells were evaluated when the external dimensions of the electrolyte membrane 6 and the external dimensions of the oxidizer electrode substrate 9 and the fuel electrode substrate 10 were equal. A single cell of this fuel cell differed from those of Inventive Example 1 only in that an external shape of an oxidizer electrode substrate 9 is a square having 90 mm to a side; because the rest is similar, the similar portions will be given identical numbering and explanation thereof omitted. Members of this kind were prepared to form a membrane electrode composite body 1 in a similar manner to those of Inventive Example 1. When outer peripheral end portions of that membrane electrode composite body 1 were observed by visual inspection and stereoscopic microscope, outer peripheral end portions of the electrolyte membrane 6 had encroached further inward than outer peripheral end portions of the oxidizer electrode substrate 9 and the fuel electrode substrate 10, and as a result, there were portions where it appeared that the oxidizer electrode substrate 9 and the fuel electrode substrate 10 had come into contact with each other and short-circuited. Then, the membrane electrode composite body 1 was operated using a method similar to that of Inventive Example 1, and when output voltage at a point in time 50 hours after startup was measured, it was significantly lower than the single cell in FIG. 12, being 563 mV.

In a membrane electrode composite body 1 of this kind, since the oxidizer electrode substrate 9 was smaller than the electrolyte membrane 6, and the outer peripheral end portions of the oxidizer electrode substrate 9 were positioned further inward than the outer peripheral end portions of the electrolyte membrane 6, a normal voltage was achieved without the oxidizer electrode substrate 9 and the fuel electrode substrate 10 short-circuiting electrically. Consequently, it is not absolutely necessary to make the size of the electrolyte membrane 6 larger than the oxidizer electrode substrate 9 and the fuel electrode substrate 10, as in Inventive Example 4, provided that outer peripheral end portions of at least one of either the oxidizer electrode substrate 9 or the fuel electrode substrate 10 are further inward than the outer peripheral end portions of the electrolyte membrane 6.

Conversely, when the oxidizer electrode substrate 9 and the fuel electrode substrate 10 were made equal in size to the electrolyte membrane 6, it was difficult to insulate between the oxidizer electrode substrate 9 and the fuel electrode substrate 10 completely using the electrolyte membrane 6, and the output voltage was low since short-circuiting occurred.

INVENTIVE EXAMPLE 8

Figure 13:
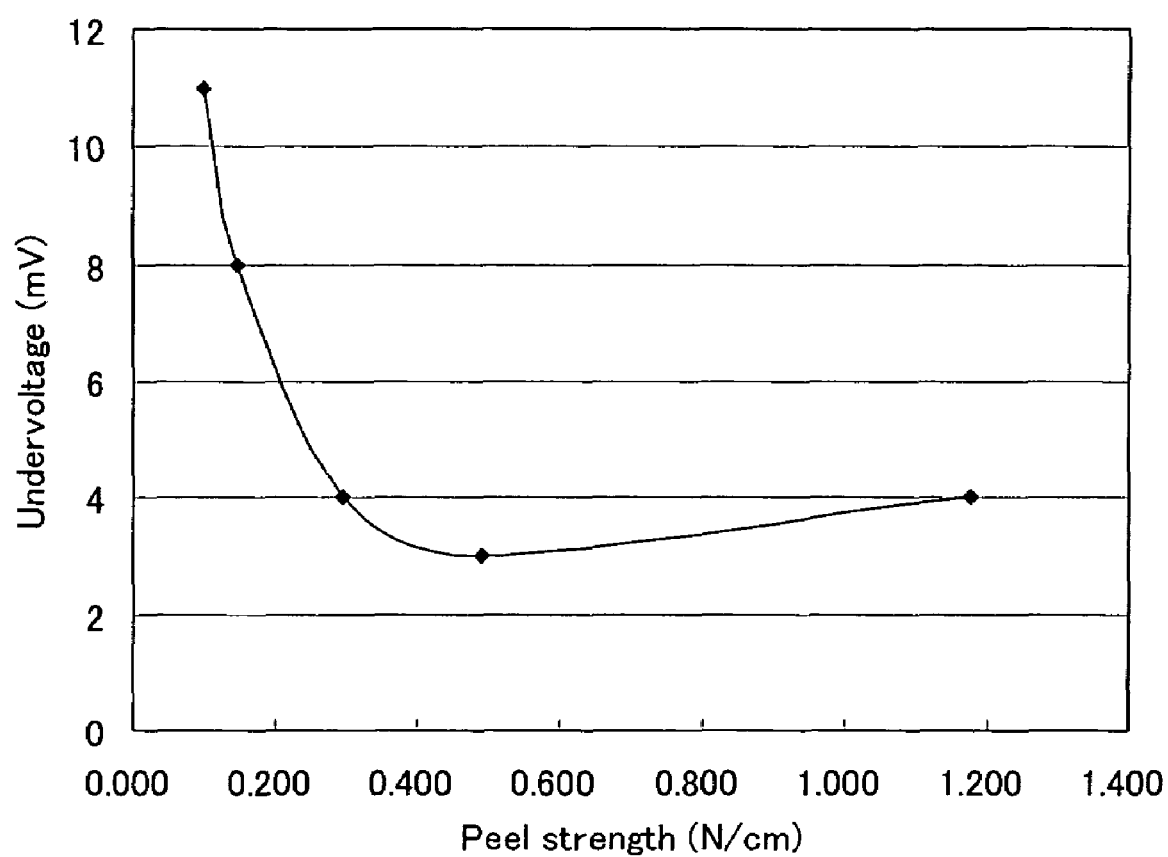
FIG. 13 is a graph expressing a relationship between peel strength and open circuit undervoltage after 2,000 hours in a single cell using a membrane electrode composite body according to Inventive Example 8 of the present invention.

FIG. 13 is a graph expressing a relationship between peel strength and open circuit undervoltage after 2,000 hours in a single cell using a membrane electrode composite body according to Inventive Example 8 of the present invention.

Resins filling electrode substrates in membrane electrode composite bodies of Inventive Example 8 differ from those in the membrane electrode composite bodies of Inventive Example 4; because the rest is similar, explanation of the similar portions will be omitted.

There were five types of resin used for filling including: the polyester resin of Inventive Example 4; two types of polyethylene; a polypropylene; and a polybutene.

The membrane electrode composite bodies were produced in a similar manner to those of Inventive Example 4. Here, outer edge portions of the anode catalyst layer 7 and the cathode catalyst layer 8, in other words the bonding widths, were set so as to be constant at 1 mm. In addition, the fill factor of the resin was also set so as to be constant at approximately ninety percent.

In these membrane electrode composite bodies, peel strength when the electrode substrates 9 and 10 bonded by the resin were pulled off the electrolyte membrane 6 was measured using a universal testing machine. Measurement was made by pulling off sample electrolyte membranes having a width of 1 cm in a 180-degree direction at a speed of 30 mm per minute.

Results showed that the peel strengths for the polyester, the first polyethylene, the second polyethylene, the polypropylene, and the polybutene were 1.18 N/cm, 0.49 N/cm, 0.30 N/cm, 0.15 N/cm, and 0.10 N/cm, respectively.

Then, fuel cells were operated in a similar manner to Inventive Example 1 using five of each type of membrane electrode composite body. The open circuit voltage at commencement of power generation was an average of 951 mV for all of the resins.

As can be seen from FIG. 13, when the peel strength was greater than or equal to 0.30 N/cm, the open circuit undervoltage after 2,000 hours had passed did not exceed four percent. However, when the peel strength was lower than that, the amount of decrease became large, and was unsuitable for practical use.

Thus, if the peel strength between the electrolyte membrane 6 and the electrode substrates 9 and 10 was less than 0.30 N/cm, peeling of the anode catalyst layer 7 and the cathode catalyst layer 8 from the electrolyte membrane 6 occurred at outer edge portions of the anode catalyst layer 7 and the cathode catalyst layer 8, greatly reducing open circuit voltage due to damage caused by concentrations of stress in the electrolyte membrane 6.

On the other hand, if the peel strength between the electrolyte membrane 6 and the electrode substrates 9 and 10 was greater than or equal to 0.30 N/cm, peeling between the anode catalyst layer 7 and the cathode catalyst layer 8 and the electrolyte membrane 6 was not observed, also enabling open circuit undervoltage to be reduced.

INVENTIVE EXAMPLE 9

Figure 14:
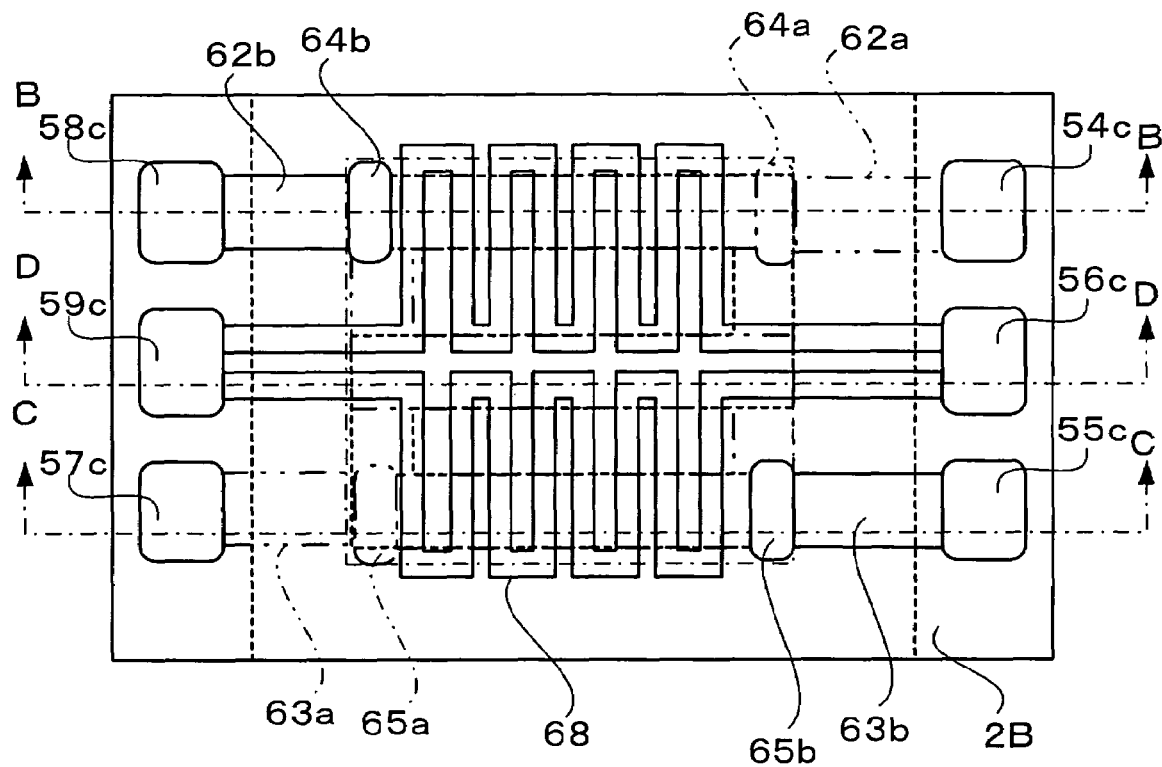
FIG. 14 is a cross section of a single cell according to Inventive Example 9 of the present invention.
Figure 15:
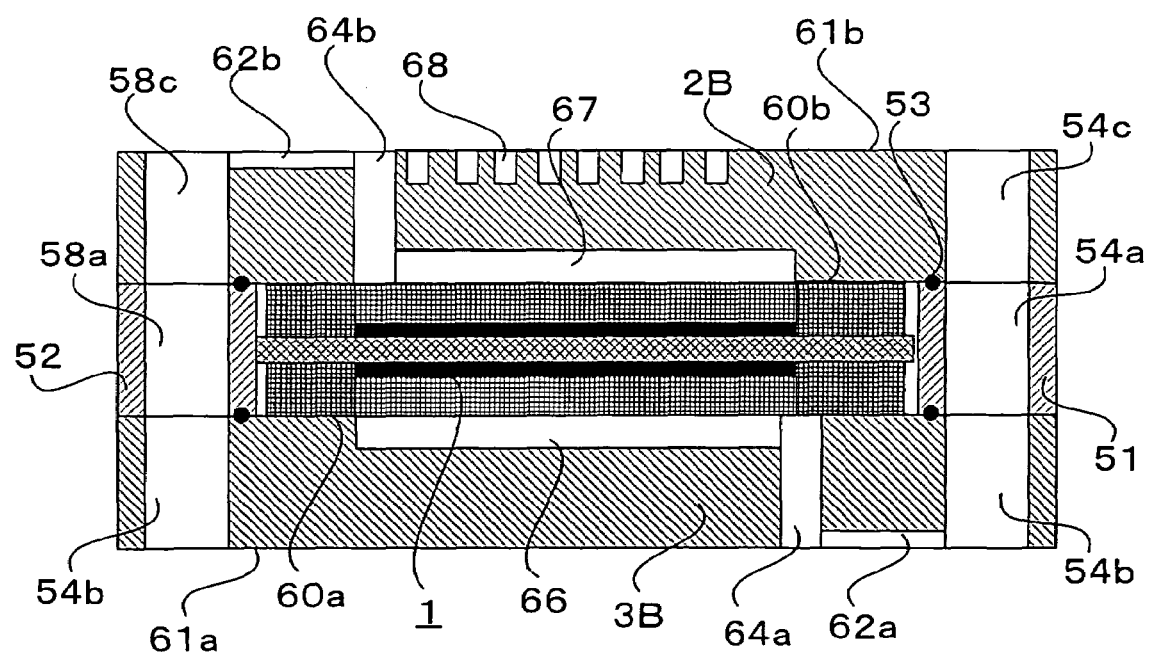
FIG. 15 is a cross section of the single cell at section BB in FIG. 14.
Figure 16:
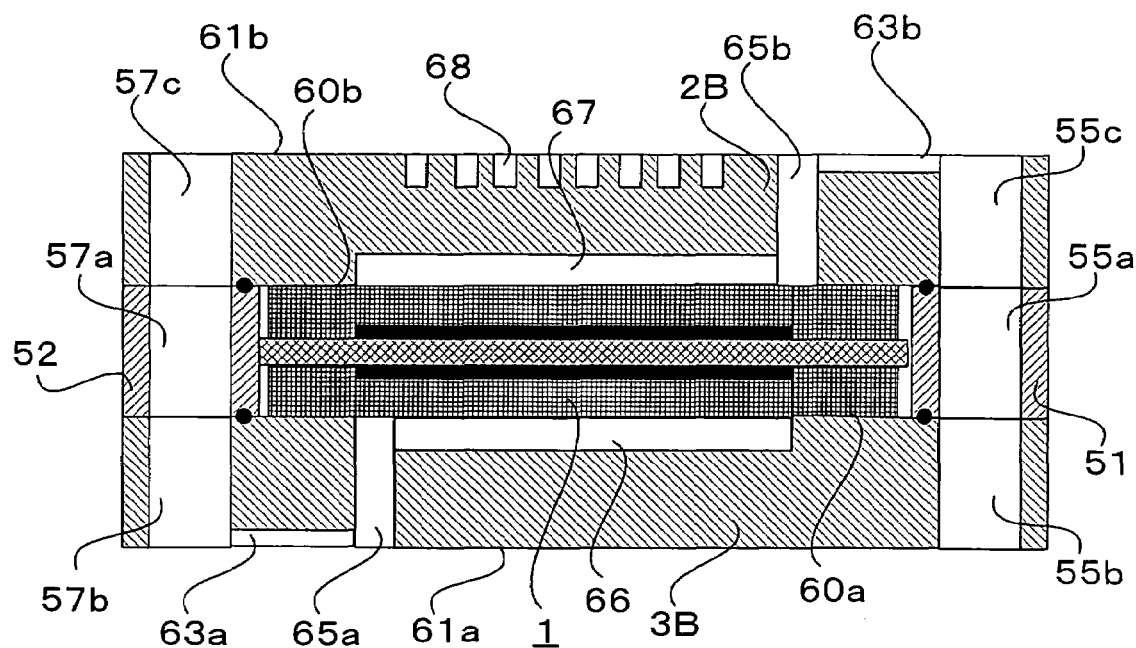
FIG. 16 is a cross section of the single cell at section CC in FIG. 14.
Figure 17:
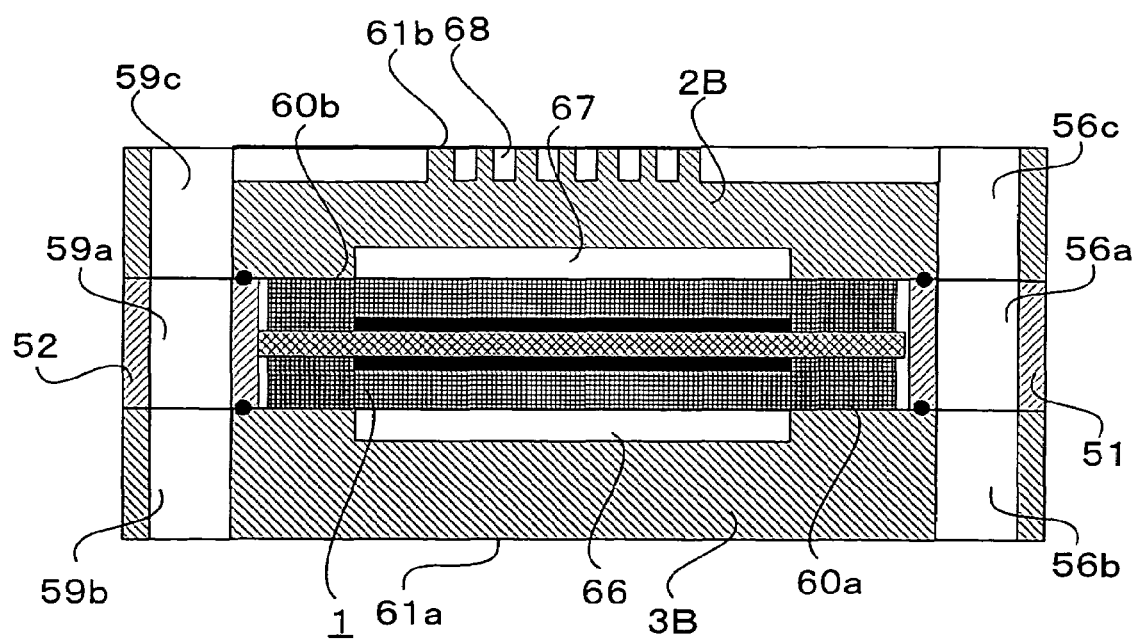
FIG. 17 is a cross section of the single cell at section DD in FIG. 14.

FIG. 14 is a cross section of a single cell according to Inventive Example 9 of the present invention. FIG. 15 is a cross section of the single cell at section BB in FIG. 14. FIG. 16 is a cross section of the single cell at section CC in FIG. 14. FIG. 17 is a cross section of the single cell at section DD in FIG. 14.

A single cell according to Inventive Example 9, as shown in FIG. 15, was constituted by: a membrane electrode composite body 1 similar to that of Inventive Example 1; a pair of first and second gaskets 51 and 52 externally contacting the membrane electrode composite body 1 on a common plane at a pair of opposite first and second end portions of the membrane electrode composite body; and a fuel separator plate 3B and an oxidizer separator plate 2B in which various manifolds were disposed in a thickness direction at first and second end portions for supplying and discharging fuel, oxidizer, and cooling liquid. In addition, seals were formed at contacting surfaces between the fuel separator plate 3B and the gaskets 51 and 52 and between the oxidizer separator plate 2B and the gaskets 51 and 52 using ethylene-propylene-diene monomer (EPDM) O rings 53.

Because the membrane electrode composite body 1 is similar to the membrane electrode composite body 1 of Inventive Example 1, explanation thereof will be omitted.

The first and second gaskets 51 and 52 were made of a polyethylene, and had a thickness identical to the thickness of the membrane electrode composite body 1. When the first and second gaskets 51 and 52 were arranged so as to externally contact the first and second end portions of the membrane electrode composite body 1, their combined external shape was equal to the external shape of the fuel separator plate 3B.

A fuel supply manifold 54a, an oxidizer discharge manifold 55a, and a cooling liquid supply manifold 56a were disposed in the first gasket 51 so as to pass through in a thickness direction. A fuel discharge manifold 57a, an oxidizer supply manifold 58a, and a cooling liquid discharge manifold 59a were disposed in the second gasket 51 so as to pass through in a thickness direction.

The fuel separator plate 3B and the oxidizer separator plate 2B had gas channels and cooling liquid channels disposed by machining in a carbon plate (manufactured by Tokai Carbon Co., Ltd.).

First and second fuel supply manifolds 54b and 54c, first and second oxidizer discharge manifolds 55b and 55c, first and second cooling liquid supply manifolds 56b and 56c, first and second fuel discharge manifolds 57b and 57c, first and second oxidizer supply manifolds 58b and 58c, and first and second cooling liquid discharge manifolds 59b and 59c were disposed at first and second end portions of the fuel separator plate 3B and the oxidizer separator plate 2B so as to pass through in a thickness direction so as to communicate with the various manifolds disposed in the first and second gaskets 51 and 52 when assembled in a single cell.

A supply communicating groove 62a communicating with the first fuel supply manifold 54b and a discharge communicating groove 63a communicating with the first fuel discharge manifold 57b were disposed in a surface 61a on an opposite side of the fuel separator plate 3B (hereinafter "opposite surface") from a surface 60a facing the membrane electrode composite body 1 (hereinafter "facing surface"). This supply communicating groove 62a and discharge communicating groove 63a extended through portions of the fuel separator plate 3B positioned in the sealing portion 5 to portions of the fuel separator plate 3B positioned in the power generating portion 4. A supply penetrating aperture 64a and a discharge penetrating aperture 65a passing through the fuel separator plate 3B from the opposite surface 61a to the facing surface 60a were disposed so as to align with ends of the supply communicating groove 62a and the discharge communicating groove 63a, respectively, positioned in the power generating portion 4. In addition, a serpentine fuel channel 66 connecting the supply penetrating aperture 64a and the discharge penetrating aperture 65a were disposed in the facing surface 60a.

Thus, supplied fuel passed from the first fuel supply manifold 54b, through the supply communicating groove 62a in the opposite surface 61a, the supply penetrating aperture 64a, the fuel channel 66 in the facing surface 60a, the discharge penetrating aperture 65a, and the discharge communicating groove 63a in the opposite surface 61a, and was discharged through the first fuel discharge manifold 57b.

In the oxidizer separator plate 2B, in a similar manner to the fuel separator plate 3B, a supply communicating groove 62b communicating with the second oxidizer supply manifold 58c and a discharge communicating groove 63b communicating with the second oxidizer discharge manifold 55c were disposed in a surface 61b on an opposite side of the oxidizer separator plate 2B (hereinafter "opposite surface") from a surface 60b facing the membrane electrode composite body 1 (hereinafter "facing surface"). This supply communicating groove 62b and discharge communicating groove 63b extended through portions of the oxidizer separator plate 2B positioned in the sealing portion 5 to portions of the oxidizer separator plate 2B positioned in the power generating portion 4. A supply penetrating aperture 64b and a discharge penetrating aperture 65b passing through the oxidizer separator plate 2B from the opposite surface 61b to the facing surface 60b were disposed so as to align with ends of the supply communicating groove 62b and the discharge communicating groove 63b, respectively, positioned in the power generating portion 4. In addition, a serpentine oxidizer channel 67 connecting the supply penetrating aperture 64b and the discharge penetrating aperture 65b were disposed in the facing surface 60b.

Thus, supplied oxidizer passed from the second oxidizer supply manifold 58c, through the supply communicating groove 62b in the opposite surface 61b, the supply penetrating aperture 64b, the oxidizer channel 67 in the facing surface 60b, the discharge penetrating aperture 65b, and the discharge communicating groove 63b in the opposite surface 61b, and was discharged through the second oxidizer discharge manifold 55c.

In addition, a serpentine cooling flow channel 68 connecting the second cooling liquid supply manifold 56c and the second cooling liquid discharge manifold 59c were disposed in the opposite surface 61b of the oxidizer separator plate 2B.

Figure 18:
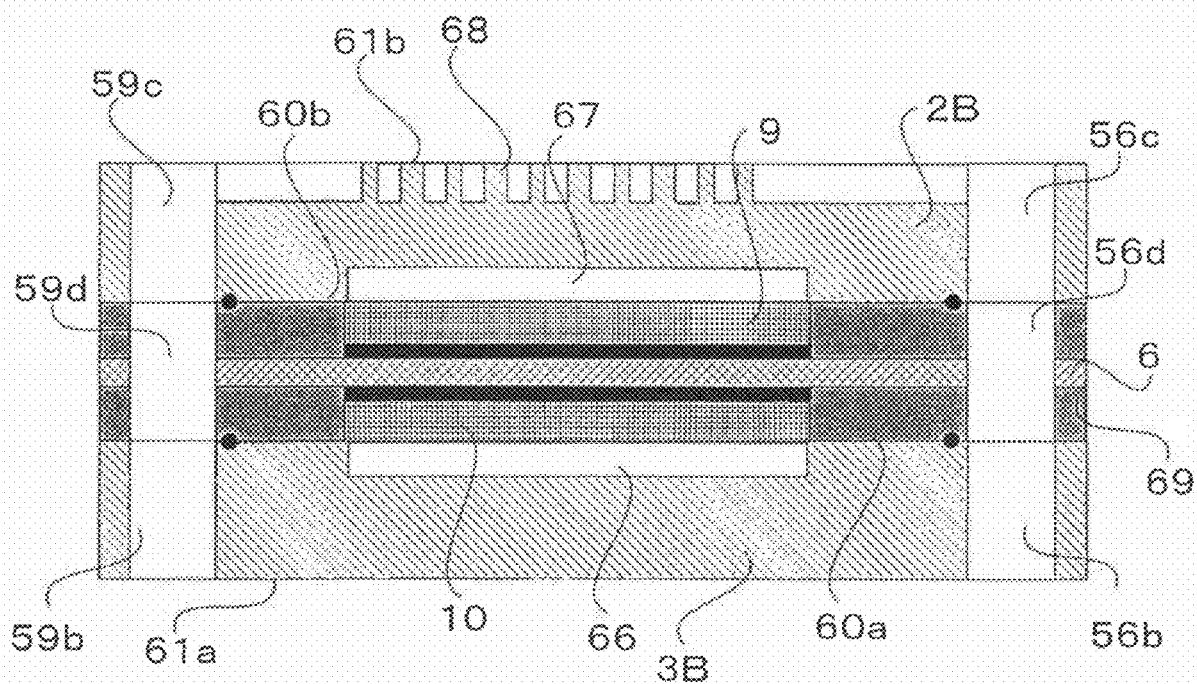
FIG. 18 is a cross section of a single cell according to Comparative Example 1.

At the same time, a single cell according to Comparative Example 1 was produced for comparison with the single cell of Inventive Example 9. The single cell of Comparative Example 1 differed from the single cell of Inventive Example 9 in that the first and second gaskets 51 and 52 were omitted. The external shape of the electrolyte membrane 6 of the membrane electrode composite body of Comparative Example 1, as shown in FIG. 18, was instead equivalent to the external shape of the fuel separator plate 3B. Frame-shaped fluorine resin gaskets 69 having a thickness of 250 μm were disposed by crimping from first and second sides on portions of the electrolyte membrane 6 surrounding the fuel electrode substrate 10 and the oxidizer electrode substrate 9. A fuel supply manifold (not shown), an oxidizer discharge manifold (not shown), a cooling liquid supply manifold 56d, a fuel discharge manifold (not shown), an oxidizer supply manifold (not shown), and a cooling liquid discharge manifold 59d were disposed in these crimped fluorine resin gaskets 69 so as to pass through in a thickness direction. Because the rest was similar to the membrane electrode composite body 1 of Inventive Example 1, explanation of the similar portions will be omitted.

Leak rates in the single cells of Inventive Example 9 and Comparative Example 1 were measured using a leak tester, but there was no leakage of gas in either.

However, in the single cell of Comparative Example 1, because the electrolyte membrane 6 is exposed to the cooling water supply manifold 56d and the cooling water discharge manifold 59d, it is not possible to use liquids containing large amounts of ions that would pollute the electrolyte membrane 6, or solvents that would make the electrolyte membrane 6 swell or dissolve for the cooling liquid.

In contrast to that, in the single cell of Inventive Example 9, the cooling liquid channel is only in contact with the gaskets 51 and 52 made of polyethylene, and the carbon separator plates 2B and 3B, and polyethylene and carbon show high durability to water and ethylene glycol. Because the electrolyte membrane 6 does not contact the cooling liquid, the electrolyte membrane 6 will not be polluted by ions in the cooling liquid.

Because portions such as the electrolyte membrane 6 and the electrode substrates 9 and 10 that are formed using expensive materials are constructed at a minimum required size, inexpensive fuel cells can be provided.

Because the fuel and oxidizer channels are not disposed at interfaces between the separator plates 2B and 3B and the sealing support portions 11 and 12 of the membrane electrode composite body 1, the membrane electrode composite body 1 can be sealed off at these interfaces. For that reason, the gaskets 51 and 52 in which the various manifolds are disposed can be replaced with inexpensive materials.

Because electric potential is not applied to the gaskets 51 and 52, they are not subjected to its influence on corrosion.

Because the cooling liquid and the electrolyte membrane 6 do not contact each other directly, cooling liquids other than pure water can be used.

Because liquids containing ethylene glycol, etc., can be used for the cooling liquid, cooling liquids matching characteristics of the fuel cell, such as freeze proofing, etc., can be used.

INVENTIVE EXAMPLE 10

Figure 19:
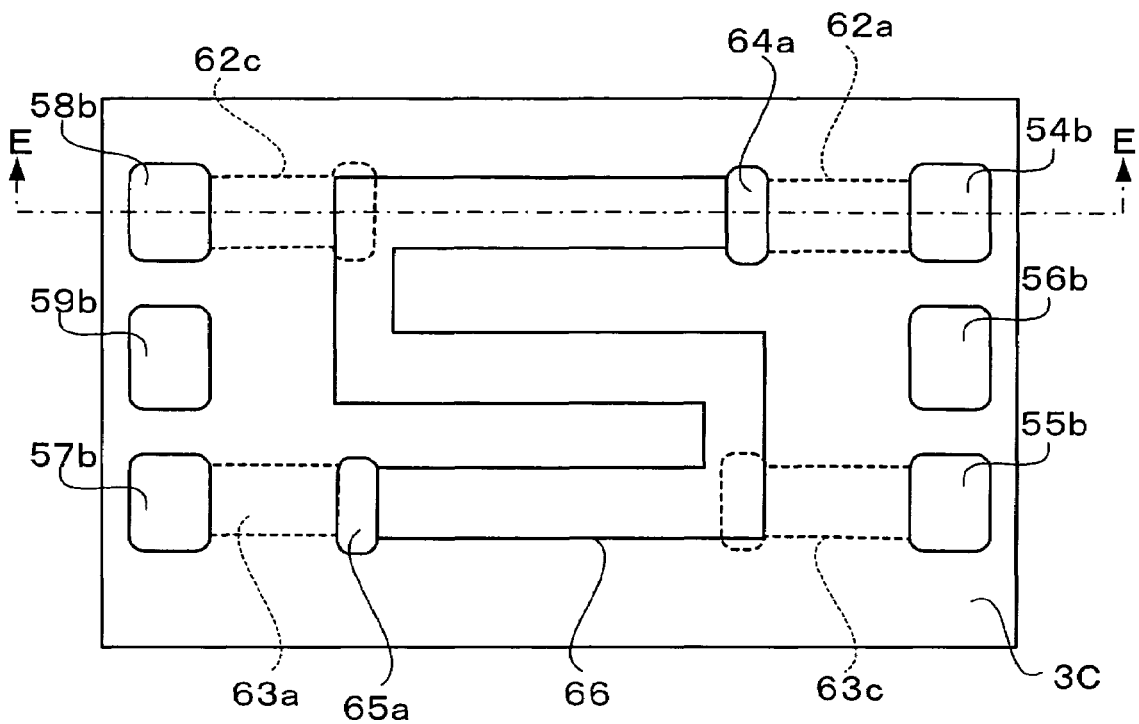
FIG. 19 is a plan of a fuel separator plate used in a single cell according to Inventive Example 10 of the present invention viewed from a surface contacting a membrane electrode composite body.
Figure 20:
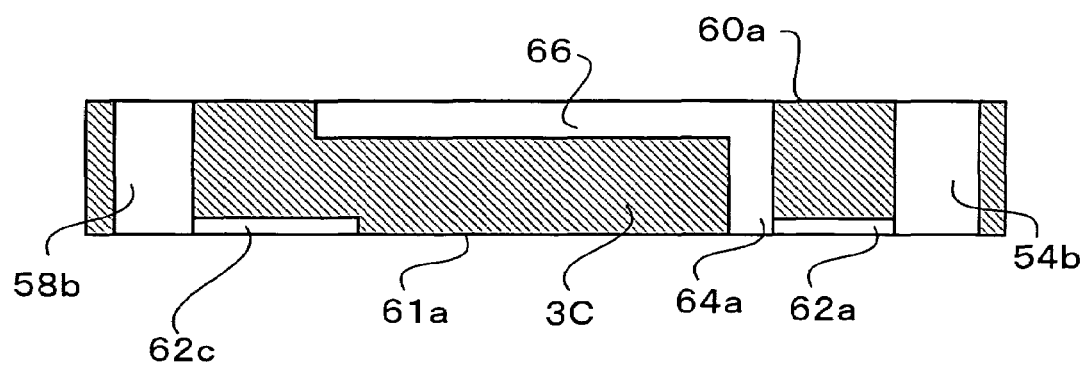
FIG. 20 is a cross section of the fuel separator plate at section EE in FIG. 19.
Figure 21:
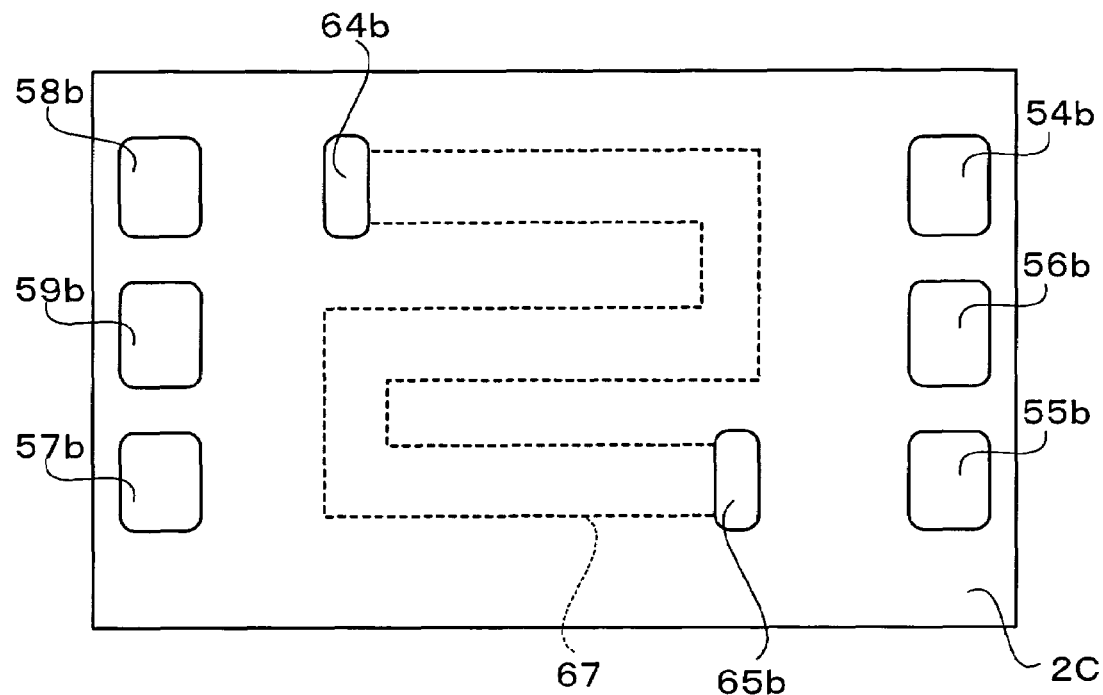
FIG. 21 is a plan of an oxidizer separator plate used in the single cell of Inventive Example 10 viewed from an opposite side to a surface contacting the membrane electrode composite body.
Figure 22:
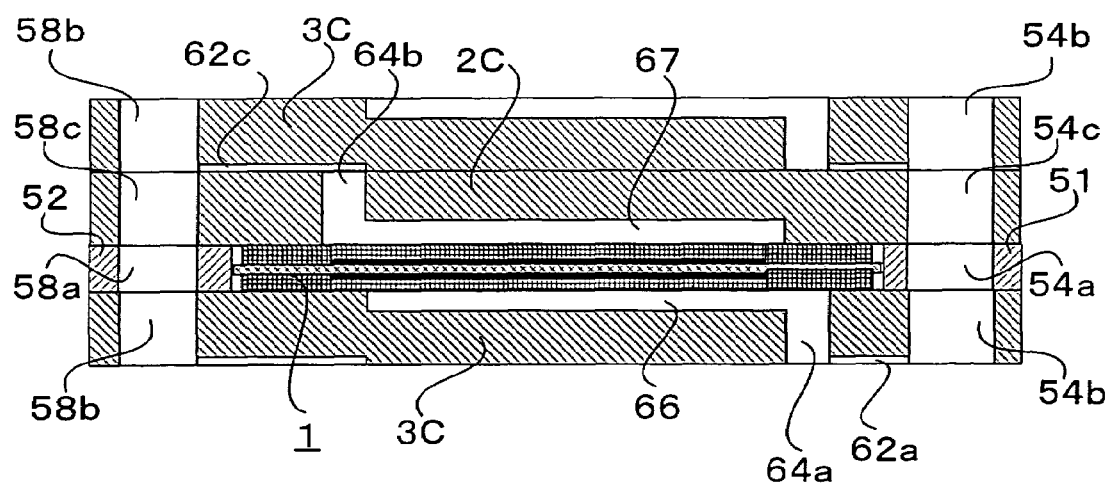
FIG. 22 is a cross section of the single cell according to Inventive Example 10 at a section EE similar to that of FIG. 19.

FIG. 19 is a plan of a surface of a fuel separator plate used in a single cell according to Inventive Example 10 of the present invention contacting a membrane electrode composite body. FIG. 20 is a cross section of the fuel separator plate at section EE in FIG. 19. FIG. 21 is a plan of a surface on an opposite side from the surface of an oxidizer separator plate used in the single cell of Inventive Example 10 contacting the membrane electrode composite body. FIG. 22 is a cross section of the single cell according to Inventive Example 10 at a section EE similar to that of FIG. 19.

A fuel separator plate 3C and an oxidizer separator plate 2C of a single cell according to Inventive Example 10 differed from those of the single cells of Inventive Example 9; because the rest is similar, similar portions will be allocated the same numbering and explanation thereof will be omitted.

In the fuel separator plate 3C, as shown in FIGS. 19 and 20, a supply communicating groove 62c extending from an oxidizer supply manifold 58b and a discharge communicating groove 63*c* extending from an oxidizer discharge manifold 55*b* were disposed in an opposite surface 61*a* of a fuel separator plate 3B according to Inventive Example 9. An extended end of this supply communicating groove 62*c* was positioned above a supply penetrating aperture 64*b* of the oxidizer separator plate 2C shown in FIG. 21, and an extended end of the discharge communicating groove 63*c* was positioned above a discharge penetrating aperture 65*b* of the oxidizer separator plate 2C.

At the same time, in the oxidizer separator plate 2C, as shown in FIG. 21, the supply penetrating aperture 64*b* and the discharge penetrating aperture 65*b* positioned in the power generating portion 4 were disposed so as to pass through, and an oxidizer flow channel 67 communicating the supply penetrating aperture 64*b* and the discharge penetrating aperture 65*b* were disposed on a facing surface 60*b*.

Thus, as shown in FIG. 22, the pathway of supplying and discharge of the oxidizer of the single cell of Inventive Example 10 differed from that of the single cell of Inventive Example 9. The oxidizer flowed from the oxidizer supply manifold 58*b*, through the supply communicating groove 62*c*, the supply penetrating aperture 64*b*, the oxidizer flow channel 67, the discharge penetrating aperture 65*b*, and the discharge communicating groove 63*c*, to the oxidizer discharge manifold 55*b*.

Thus, because machining is required only on two surfaces of the fuel separator plate and one surface of the oxidizer separator plate, machining costs can be reduced. Moreover, groove machining is applied to two surfaces of the fuel separator plate, but machining costs can also be reduced by machining grooves in two surfaces of the oxidizer separator plate.

INVENTIVE EXAMPLE 11

Figure 23:
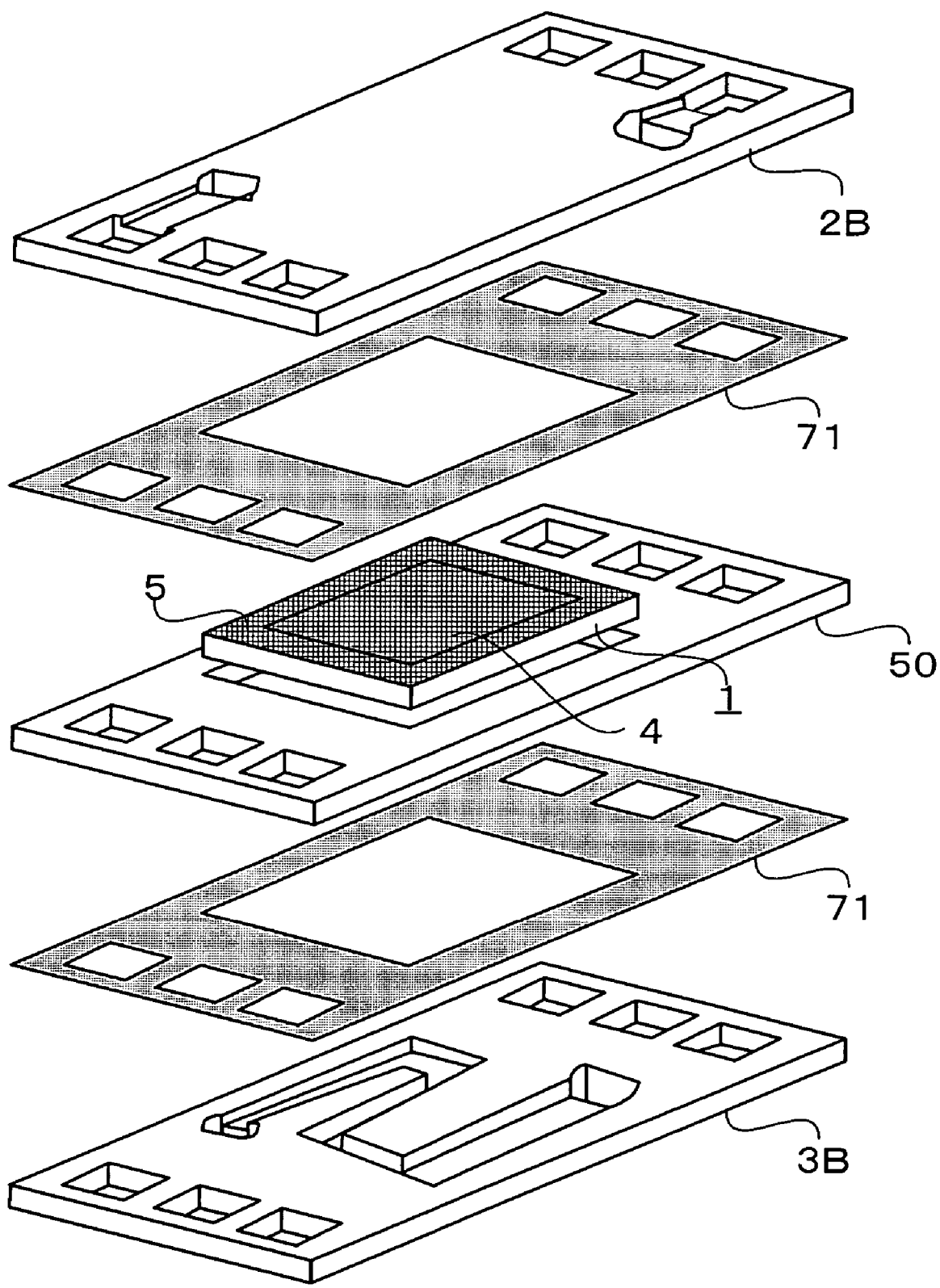
FIG. 23 is a diagram showing stacking of a single cell according to Inventive Example 11 of the present invention.

FIG. 23 is a diagram showing stacking of a single cell according to Inventive Example 11 of the present invention.

A single cell according to Inventive Example 11 differed from the single cell of Inventive Example 9 in that a soft elastically-deforming resin 71 was used instead of the EPDM O ring 53; because the rest was similar to Inventive Example 9, similar portions will be allocated the same numbering and explanation thereof will be omitted.

Ethylene-propylene-diene monomers (EPDMs) and silicone-rubber resins, for example, can be used for the soft elastically-deforming resin 71, but the soft elastically-deforming resin 71 is not limited to these.

Because surface pressure can be reliably applied to the membrane electrode composite body by forming a seal around the various manifolds using the soft elastically-deforming resin in this manner, situations in which pressure applied to the single cell is absorbed around the various manifolds and surface pressure fails to act on the membrane electrode composite body can be prevented.

Because the resin filling the membrane electrode composite body positioned in the sealing portion can be different from the sealing resin forming the seal around the various manifolds, resins suitable for each can be adopted. The filling resin can be selected with consideration for properties such as melting at greater than or equal to the operating temperature of the fuel cell and less than or equal to the heat tolerance threshold of the electrolyte membrane to penetrate inside the electrode substrates, or properties relative to water generated by air, hydrogen, and chemical reactions, etc. On the other hand, because it is not necessary for the resin forming the seal around the manifolds to melt, it can be selected with consideration for properties such as superior sealing, or oil resistance relative to organic solvents such as ethylene glycol, etc.

Moreover, an example has been explained in which entire surfaces of the gaskets 50 are bonded to the fuel separator 3 and the oxidizer separator 2 by the soft resin, but similar effects can also be achieved seals are formed only around the perimeter of each of the various manifolds.

What is claimed is:

1. A fuel cell, comprising:
a membrane electrode composite body in which a cathode catalyst layer and an anode catalyst layer are joined to central portions of two surfaces of a solid polymer electrolyte membrane and are further held from two sides between a fuel electrode substrate having a surface area that is larger than that of said cathode catalyst layer and an oxidizer electrode substrate having a surface area that is larger than that of said anode catalyst layer, wherein:
said fuel electrode substrate includes a fuel-sealing support portion surrounding said cathode catalyst layer, said fuel-sealing support portion including pores partially or wholly filled with a resin;
said oxidizer electrode substrate includes an oxidizer-sealing support portion surrounding said anode catalyst layer, said oxidizer-sealing support portion including pores partially or wholly filled with said resin; and
said fuel-sealing support portion is bonded to said solid polymer electrolyte membrane by said resin at a position closer to an outer edge of said solid polymer electrolyte membrane than is said cathode catalyst; and
said oxidizer-sealing support portion is bonded to said solid polymer electrolyte membrane by said resin at a position closer to the outer edge of said solid polymer electrolyte membrane than is said anode catalyst.

2. The fuel cell according to claim 1, wherein:
a frame-shaped outer edge portion of said cathode catalyst layer and a frame-shaped outer edge portion of said anode catalyst layer are each filled with said resin; and
said outer edge portion of said cathode catalyst layer and said outer edge portion of said anode catalyst layer are each bonded to said solid polymer electrolyte membrane by said resin.

3. The fuel cell according to claim 2, wherein:
a frame width of said outer edge portion of said cathode catalyst layer and said outer edge portion of said anode catalyst layer is greater than or equal to 0.5 mm and less than or equal to 5.0 mm.

4. The fuel cell according to claim 1, wherein:
an outer peripheral end portion of at least one of said oxidizer electrode substrate or said fuel electrode substrate is positioned inside an outer peripheral end portion of said solid polymer electrolyte membrane.

5. The fuel cell according to claim 1, wherein:
an outer peripheral end portion of said oxidizer electrode substrate, said fuel electrode substrate, and said solid polymer electrolyte membrane is surrounded by said resin.

6. The fuel cell according to claim 1, wherein:
said resin is a hardened form of a fluid resin.

7. The fuel cell according to claim 1, wherein:
said resin is a thermoplastic resin having a melting point that is higher than a maximum temperature during fuel cell operation.

8. The fuel cell according to claim 1, wherein:
greater than or equal to 50 volume percent of said pores of said fuel-sealing support portion and said oxidizer-sealing support portion are filled with said resin.

9. The fuel cell according to claim 1, wherein:
a peel strength between said fuel-sealing support portion and said solid polymer electrolyte membrane and between said oxidizer-sealing support portion and said solid polymer electrolyte membrane is greater than or equal to 0.30 N/cm.

10. The fuel cell according to claim 1, further comprising:
an oxidizer separator plate and a fuel separator plate holding said membrane electrode composite body from two sides, said oxidizer electrode substrate being bonded to said oxidizer separator plate by said resin, and said fuel electrode substrate being bonded to said fuel separator plate by said resin.

11. The fuel cell according to claim 10, wherein:
an outer edge portion of said anode catalyst layer is bonded to said oxidizer separator plate by said resin; and
an outer edge portion of said cathode catalyst layer is bonded to said fuel separator plate by said resin.

12. The fuel cell according to claim 10, wherein:
said resin filling said oxidizer-sealing support portion is a continuous resin film that is connected between said solid polymer electrolyte membrane and said oxidizer separator plate; and
said resin filling said fuel-sealing support portion is a continuous resin film that is connected between said solid polymer electrolyte membrane and said fuel separator plate.

13. The fuel cell according to claim 10, wherein:
said fuel separator plate and said oxidizer separator plate further comprise:
  various manifolds through which a fuel and an oxidizer are supplied or discharged, each disposed at a position outside said anode catalyst layer where said oxidizer separator plate and said fuel separator plate overlap;
  a supply communicating groove and a discharge communicating groove disposed in portions of opposite surfaces of said fuel separator plate and said oxidizer separator plate from surfaces facing said membrane electrode composite body that overlap with said oxidizer-sealing support portion so as to extend along said opposite surfaces from said various manifolds;
  a supply penetrating aperture and a discharge penetrating aperture disposed in portions of said fuel separator plate and said oxidizer separator plate overlapping with said anode catalyst layer so as to pass through from said opposite surface to a facing surface and connect with said supply communicating groove and said discharge communicating groove, respectively; and
  a flow channel disposed in said facing surface so as to communicate between said supply penetrating aperture and said discharge penetrating aperture.

14. The fuel cell according to claim 13, wherein:
said fuel separator plate and said oxidizer separator plate further comprise:
  a cooling liquid supply manifold and a cooling liquid discharge manifold through which a cooling liquid is supplied and discharged, each disposed at a position outside said membrane electrode composite body where said oxidizer separator plate and said fuel separator plate overlap; and
  a cooling flow channel disposed in an opposite surface of either said fuel separator plate or said oxidizer separator plate from a surface facing said membrane electrode composite body so as to communicate between said cooling liquid supply manifold and said cooling liquid discharge manifold,
  said fuel cell further comprising a gasket disposed beside said membrane electrode composite body, in which various manifolds are disposed at positions overlapping with said various manifolds of said oxidizer separator plate.

15. The fuel cell according to claim 14, wherein:
an interface between said fuel separator plate and said gasket and between and said oxidizer separator plate and said gasket is sealed by a sealing material that is different from said resin.

16. The fuel cell according to claim 14, wherein:
said cooling liquid is ethylene glycol, or water, or a mixture thereof.

17. The fuel cell according to claim 1, wherein outer edge portions of said cathode catalyst layer and said anode catalyst layer and inner edge portions of said fuel-sealing support portion and said oxidizer-sealing support portion overlap.

18. The fuel cell according to claim 17, wherein a width of the overlap is greater than or equal to a thickness of said fuel electrode substrate and said oxidizer electrode substrate.

19. The fuel cell according to claim 18, wherein the width of the overlap is less than or equal to 5 mm.

20. The fuel cell according to claim 19, wherein the width of the overlap is less than or equal to 2 mm.

* * * * *